US012485154B2

(12) United States Patent
Soung et al.

(10) Patent No.: US 12,485,154 B2
(45) Date of Patent: *Dec. 2, 2025

(54) ANTI-INFLUENZA VIRUS COMPOSITION, COMPOSITION FOR TREATING RESPIRATORY DISEASES, AND ANTI-AGING COMPOSITION, COMPRISING DARK GINSENG EXTRACT

(71) Applicant: CJ CHEILJEDANG CORPORATION, Seoul (KR)

(72) Inventors: Do Yu Soung, Suwon-si (KR); Son Woo Kim, Suwon-si (KR); So Hyeong Kim, Suwon-si (KR); Yong Ki Seo, Suwon-si (KR); Nam Hoon Cho, Suwon-si (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 746 days.

This patent is subject to a terminal disclaimer.

(21) Appl. No.: 17/611,968

(22) PCT Filed: May 20, 2020

(86) PCT No.: PCT/KR2020/006589
§ 371 (c)(1),
(2) Date: Nov. 17, 2021

(87) PCT Pub. No.: WO2020/235928
PCT Pub. Date: Nov. 26, 2020

(65) Prior Publication Data
US 2022/0249587 A1 Aug. 11, 2022

(30) Foreign Application Priority Data
May 20, 2019 (KR) .................. 10-2019-0058675

(51) Int. Cl.
*A61K 36/258* (2006.01)
*A23L 33/105* (2016.01)
*A61K 31/704* (2006.01)
*A61K 47/10* (2017.01)
*A61K 47/36* (2006.01)

(52) U.S. Cl.
CPC .......... *A61K 36/258* (2013.01); *A23L 33/105* (2016.08); *A61K 31/704* (2013.01); *A61K 47/10* (2013.01); *A61K 47/36* (2013.01); *A61K 2236/10* (2013.01); *A61K 2236/333* (2013.01); *A61K 2236/37* (2013.01)

(58) Field of Classification Search
None
See application file for complete search history.

(56) References Cited

U.S. PATENT DOCUMENTS

| 4,446,130 | A | * | 5/1984 | Hachiya | A61K 36/258 |
|---|---|---|---|---|---|
| | | | | | 424/728 |
| 9,050,313 | B2 | | 6/2015 | Adamko et al. | |
| 9,289,458 | B2 | * | 3/2016 | Ko | A23L 33/105 |
| 2011/0086052 | A1 | | 4/2011 | Adamko et al. | |
| 2011/0177297 | A1 | | 7/2011 | Jung et al. | |
| 2013/0295205 | A1 | | 11/2013 | Adamko et al. | |
| 2013/0324486 | A1 | * | 12/2013 | Lee | A23L 19/00 |
| | | | | | 514/26 |
| 2017/0368083 | A1 | * | 12/2017 | Yu | A61P 13/12 |
| 2019/0038691 | A1 | * | 2/2019 | Lee | A61K 36/258 |

FOREIGN PATENT DOCUMENTS

| CN | 102014941 A | 4/2011 | | |
|---|---|---|---|---|
| KR | 10-1999-0015090 A | 3/1999 | | |
| KR | 100543862 B1 | 1/2006 | | |
| KR | 10-0868249 B1 | 11/2008 | | |
| KR | 20090095354 A | 9/2009 | | |
| KR | 10-2010-0038258 A | 4/2010 | | |
| KR | 10-2010-0132438 A | 12/2010 | | |
| KR | 20100134463 A | 12/2010 | | |
| KR | 101035463 B1 | 5/2011 | | |
| KR | 101082173 B1 | 11/2011 | | |
| KR | 10-2012-0116374 A | 10/2012 | | |
| KR | 20130080644 A | 7/2013 | | |
| KR | 20130112323 A | 10/2013 | | |
| KR | 10-2013-0120069 A | 11/2013 | | |
| KR | 2016027635 A | * | 3/2016 | .......... A61K 36/258 |
| KR | 10-2016-0058212 A | 5/2016 | | |
| KR | 10-1711387 B1 | 3/2017 | | |
| KR | 10-2018-0075751 A | 7/2018 | | |
| KR | 10-1916189 B1 | 11/2018 | | |
| KR | 10-2019-0018175 A | 2/2019 | | |
| KR | 10-2019-0050626 A | 5/2019 | | |

(Continued)

OTHER PUBLICATIONS

Office Action issued on Oct. 31, 2024 for the corresponding Chinese patent application No. 202310687206.5, (13 pages including English Translation).
Sun A Lee et al., "Changes in the Contents of Prosapogenin in the Red Ginseng (*Panax ginseng*) Depending on Steaming Batches", Journal of Ginseng Research, 2012, vol. 36, No. 1, pp. 102-106.
Jin Young Kim et al., "Effect of Oral Administration of Korean Red Ginseng on Influenza A (H1N1) Virus Infection", Journal of Ginseng Research, 2011, vol. 35, No. 1, pp. 104-110.
Zhou Qiu-qiu et al., "Research progress on processing drugs methods, chemical composition and pharmacological activity of red ginseng", Shanghai Journal of Traditional Chinese Medicine, 2016, vol. 50, No. 2, pp. 97-100.
Li Yun et al., "Observation of the Curative Effect of Shen Mai in the Treatment of Pneumoconiosis Respiratory Failure", Occupation and Health, Jan. 2006, vol. 22, No. 2, pp. 98-99.

(Continued)

*Primary Examiner* — Bethany P Barham
*Assistant Examiner* — Peter Anthopolos
(74) *Attorney, Agent, or Firm* — Morgan, Lewis & Bockius LLP

(57) ABSTRACT

The present invention relates to an anti-influenza virus composition, a composition for treating respiratory diseases, and an anti-aging composition, each of which comprises a dark ginseng extract.

15 Claims, 9 Drawing Sheets

(56) References Cited

FOREIGN PATENT DOCUMENTS

| WO | 2010-039006 A2 | 4/2010 |
| WO | 2018-194359 A1 | 10/2018 |

OTHER PUBLICATIONS

Extended European Search Report issued on May 23, 2023 for the corresponding European patent application No. 20810528.8 (10 pages).
Database WPI Week 201931, Thomson Scientific, London, GB; an 2019-21610U, XP002809221 (2 pages).
Database WPI Week 201877, Thomson Scientific, London, GB; an 2018-87998M, XP002809222 (2 pages).
Database WPI Week 201941 Thomson Scientific, London, GB; AN 2019-449365, XP002809223 (2 pages).
Seo Yun-Soo et al., "Black ginseng extract exerts anti-hyperglycemic effect via modulation of glucose metabolism in liver and muscle", Journal of Ethnopharmacology, Elsevier, Ireland Ltd, IE, vol. 190, May 31, 2016, pp. 231-240, XP029707318, ISSN: 0378-8741, DOI: 10.1016/J.JEP.2016.05.060.
Metwaly Ahmed M. et al., "Black Ginseng and Its Saponins: Preparation, Phytochemistry and Pharmacological Effects", Molecules, vol. 24, No. 10, May 14, 2019, p. 1856, XP93008006, DOI: 10.3390/molecules24101856.
Database WPI Week 201026 Thomson Scientific, London, GB; AN 2010-E00929, XP002809240 ( 3 pages).
Japanese Office Action for corresponding JP Application No. 2021-569178 issued on Dec. 5, 2022 (6 pages.
Eun-Ha Kim et al., "Greater Efficacy of Black Ginseng (CJ EnerG) over Red Ginseng against Lethal Influenza A Virus Infection", Nutrients 2019, vol. 11, No. 1879, Aug. 13, 2019, pp. 1-14.
Yan Jin et al., "Ginsenosides Rg5 and Rk1, the skin-whitening agents in black ginseng", Journal of Functional Foods, vol. 45, 2018, pp. 67-74.
PCT International Search Report for PCT Application No. PCT/KR2020/006589 mailed Sep. 1, 2020 (5 pages, with English translation).
PCT Written Opinion for PCT Application No. PCT/KR2020/006589 mailed Sep. 1, 2020 (4 pages).
Chinese Office Action for CN Application No. 202080037279.4 mailed Feb. 17, 2022 (13 page, with English translation).
Chen et al., "Domestic and Foreign Research Progress of Black Ginseng," Ginseng Research, 2019, vol. 1, pp. 42-46 (English abstract).
Office Action issued on Aug. 7, 2023 for the corresponding Korean patent application 10-2023-0081193 (8 pages including machine translation).
Yan Jin et al., "Effects of Fresh Ginseng Size and Shape on Quality of Black Ginseng", The Korean Journal of Food and Nutrition, 2016, vol. 29, No. 5, pp. 610-617 (with English abstract).
Yan Jin et al., "Changes of Ginsenosides and Physiochemical Properties in Ginseng by New 9 Repetitive Steaming and Drying Process", Korean Journal of Plant Resources, Aug. 2012, vol. 25, No. 4, pp. 473-481 (with English abstract).
Office Action issued on Aug. 7, 2023 for the corresponding Singapore patent application 11202112866X (12 pages).
Kim et al., "Preparation of Black Panax Ginseng by New Methods and its Antitumor Activity", The Korea Journal of Herbology, vol. 23, No. 1, 2008, pp. 85-92, with an English abstract.
Office Action issued in corresponding Singaporean Patent Application No. 11202112866X, dated Aug. 23, 2025.

* cited by examiner

[FIG. 1a]
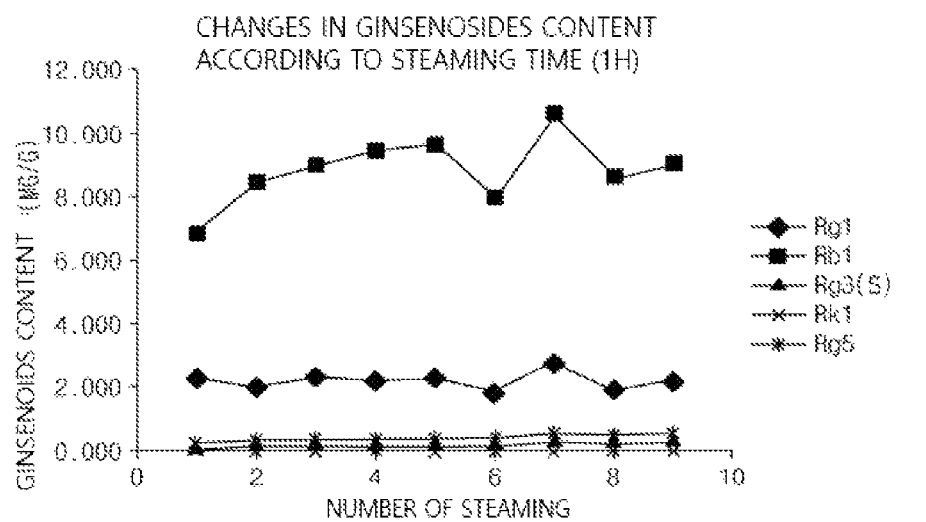
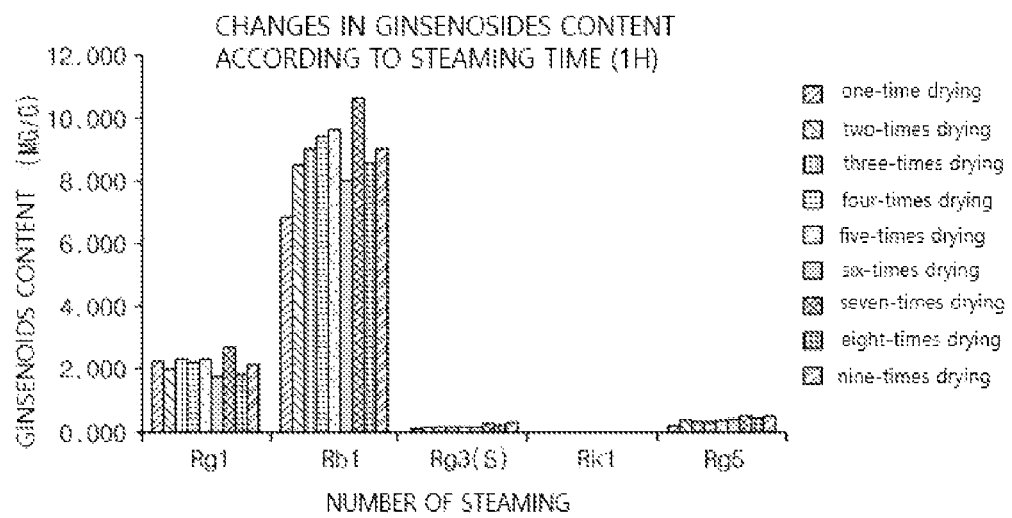

[FIG. 1b]
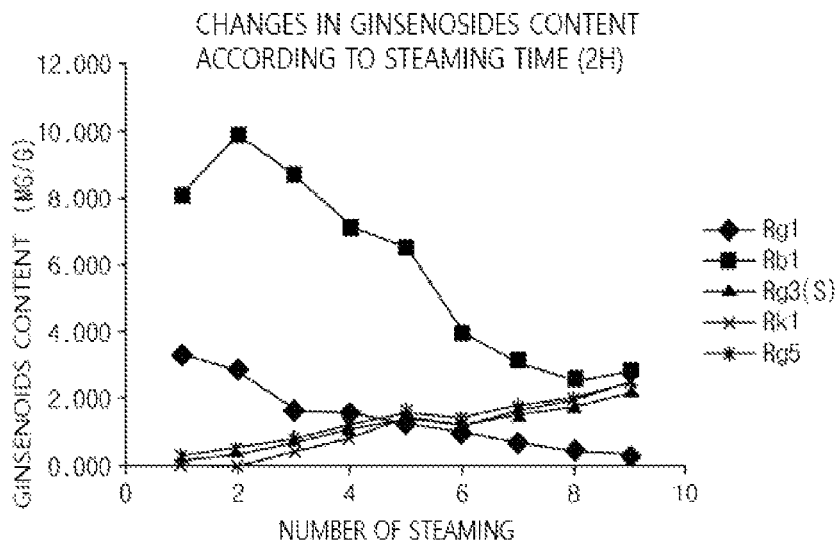
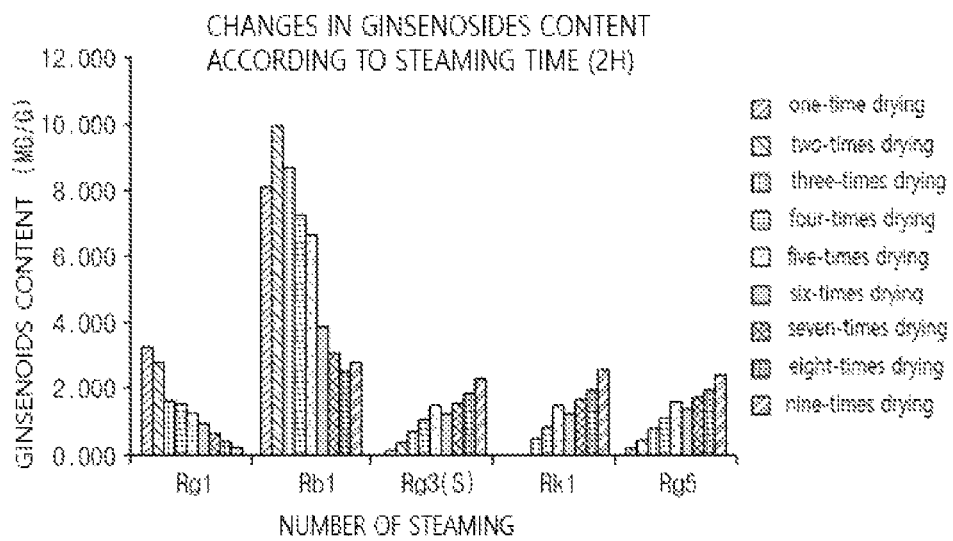

[FIG. 1c]
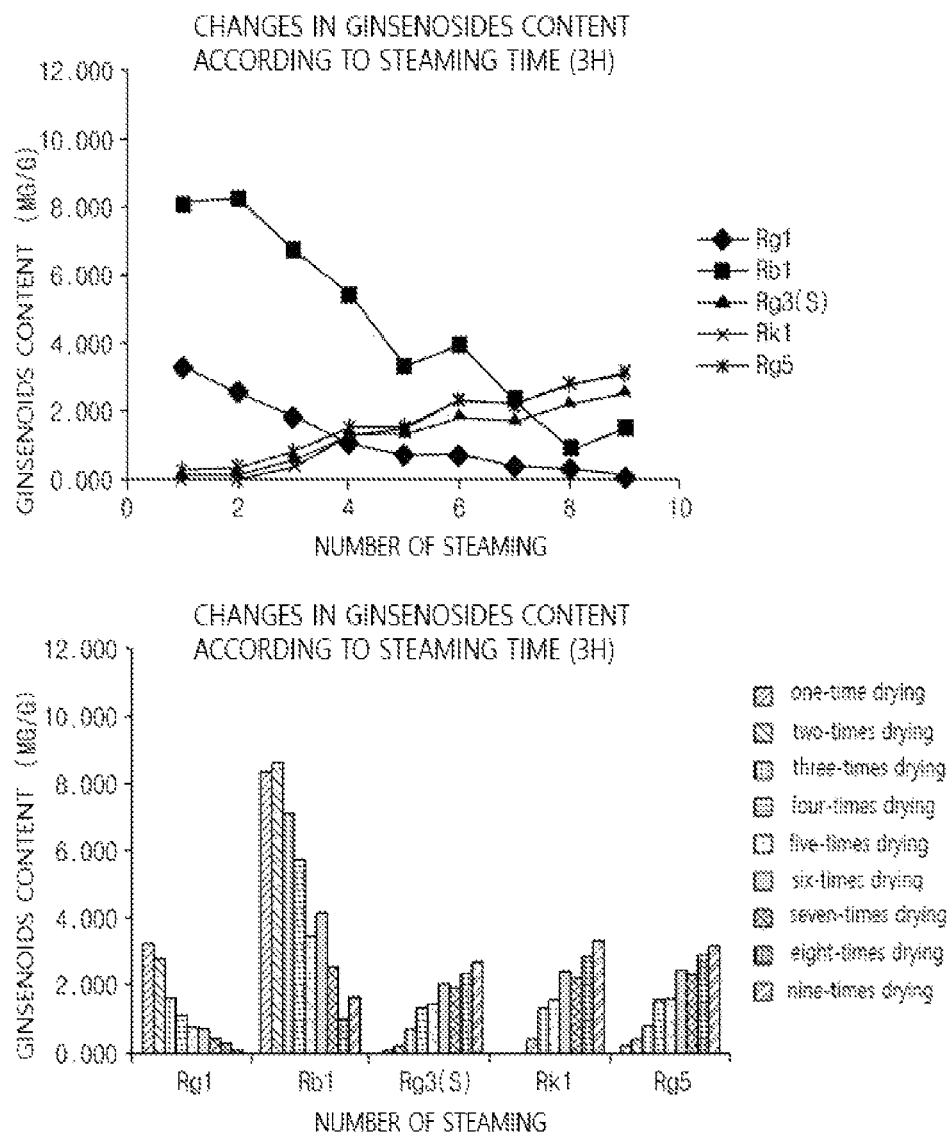

[FIG. 2a]
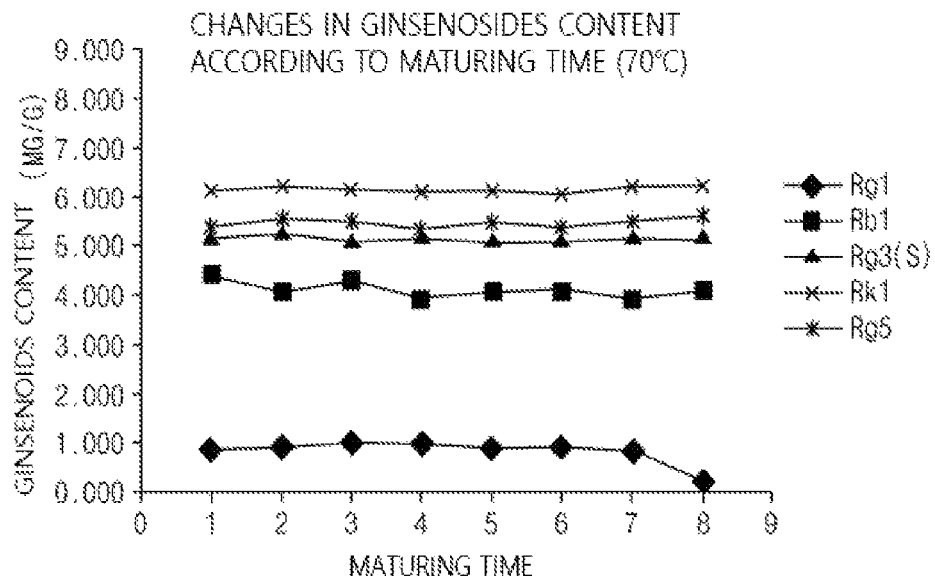
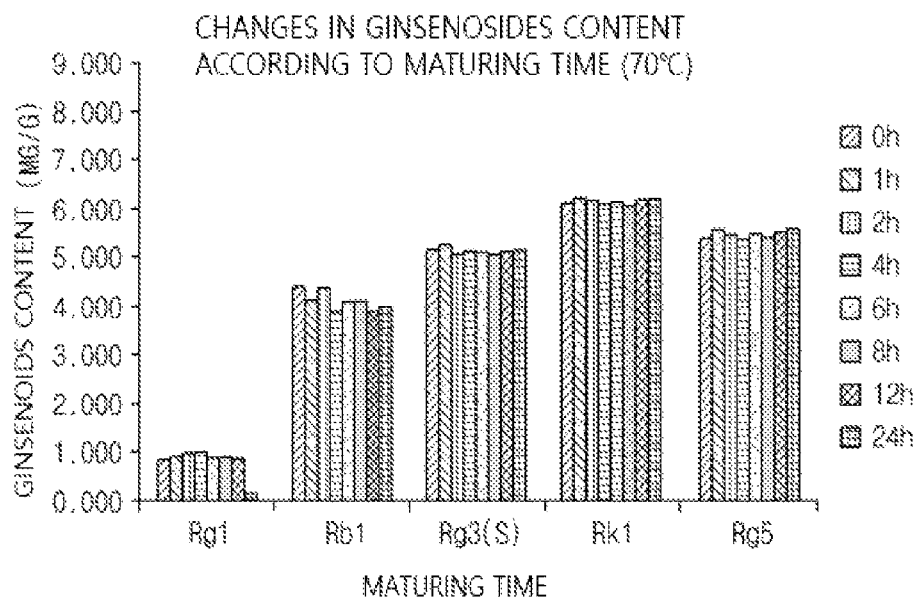

[FIG. 2b]
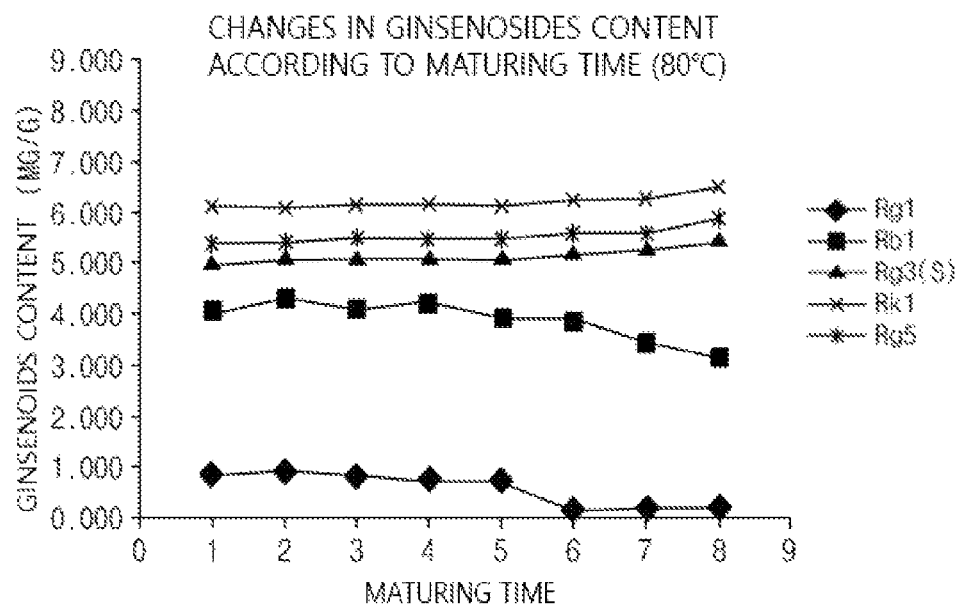
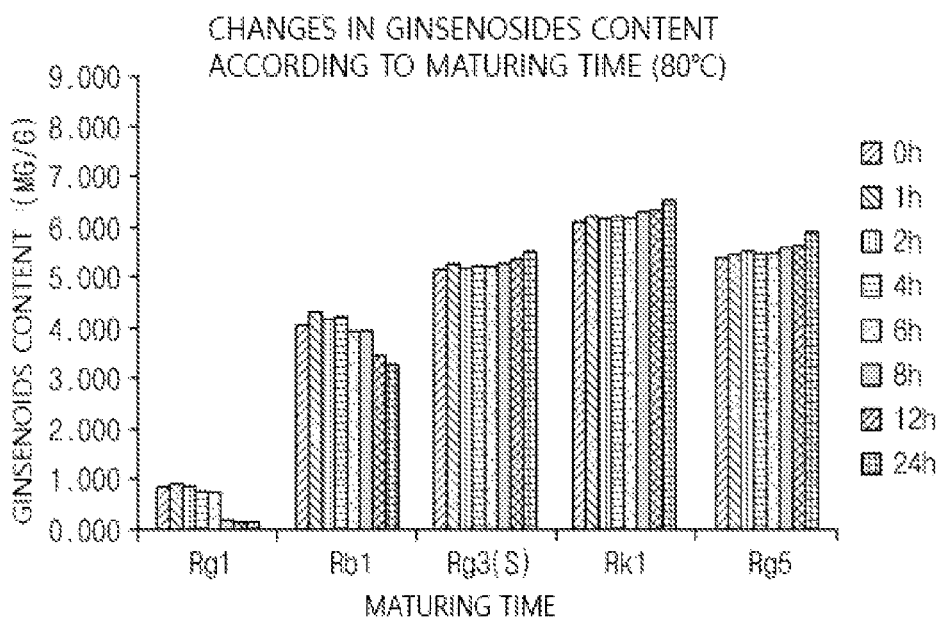

[FIG. 2c]
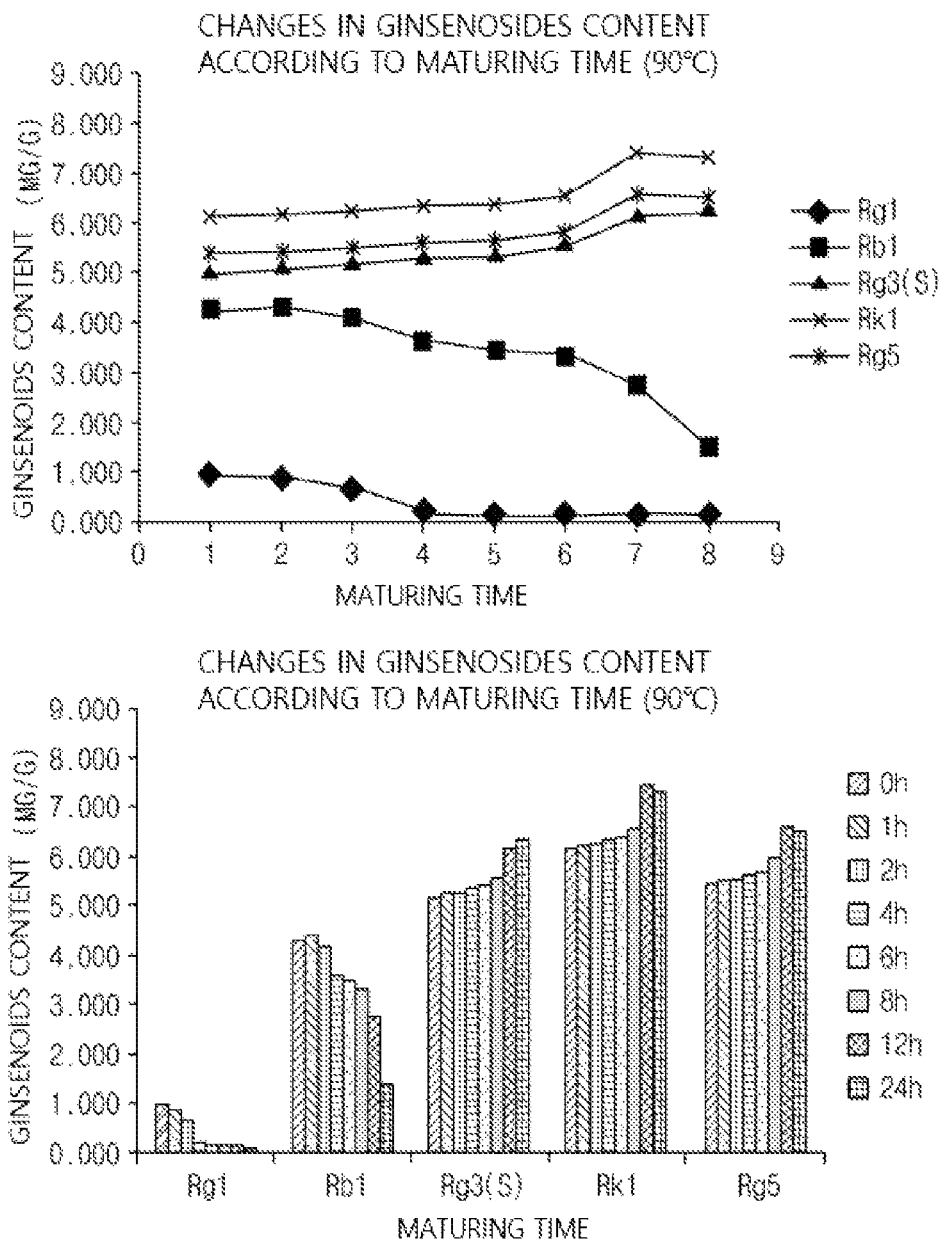

[FIG. 3]
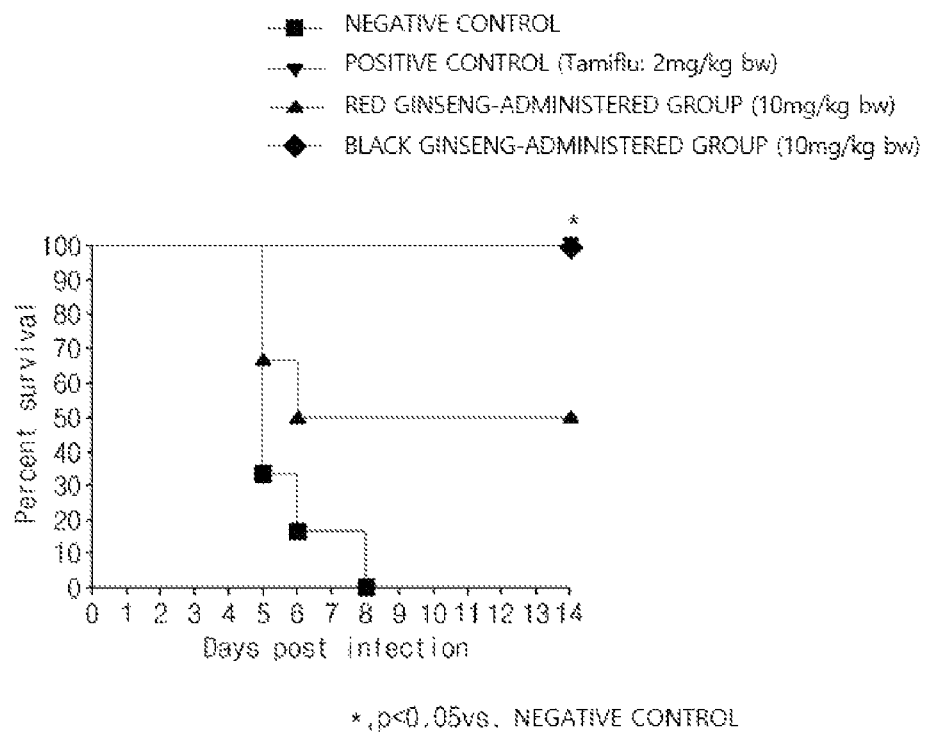
[FIG. 4]
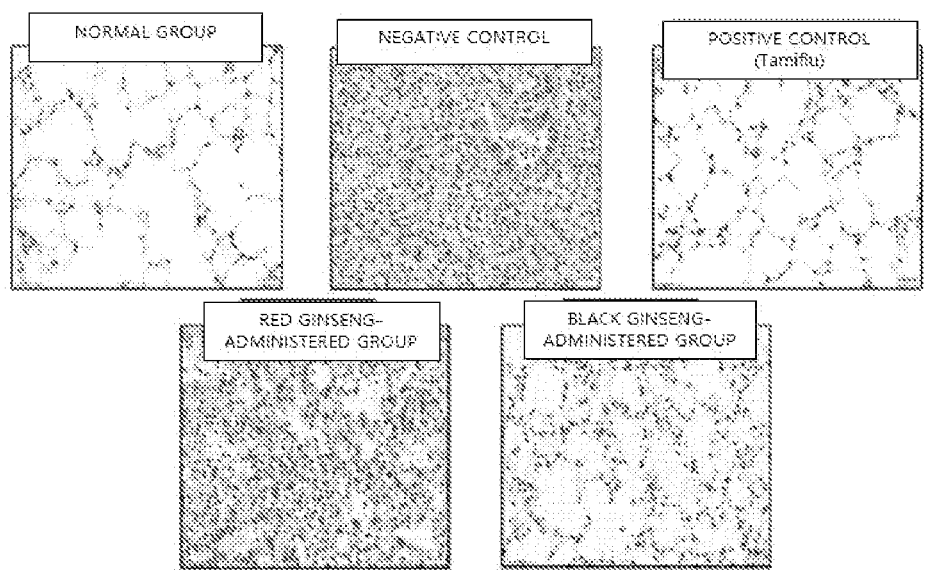

[FIG. 5a]
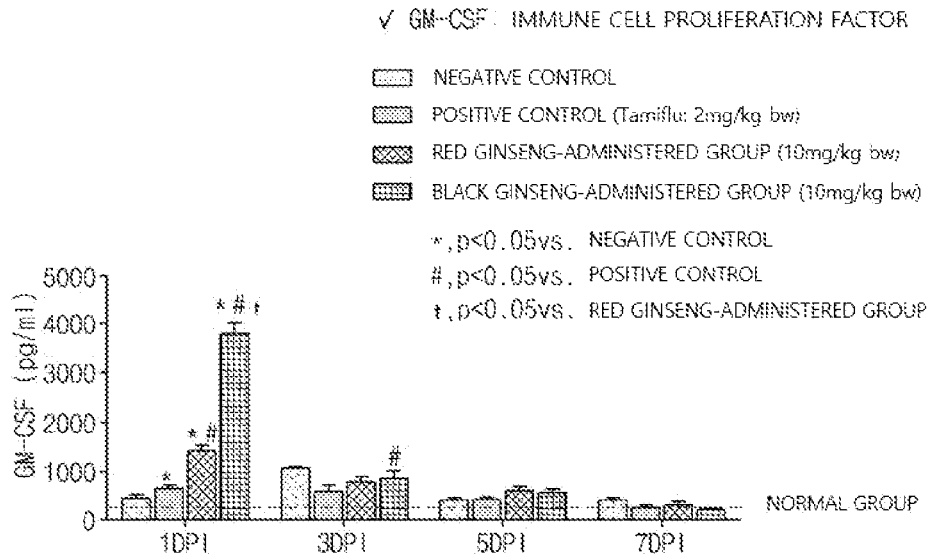
[FIG. 5b]
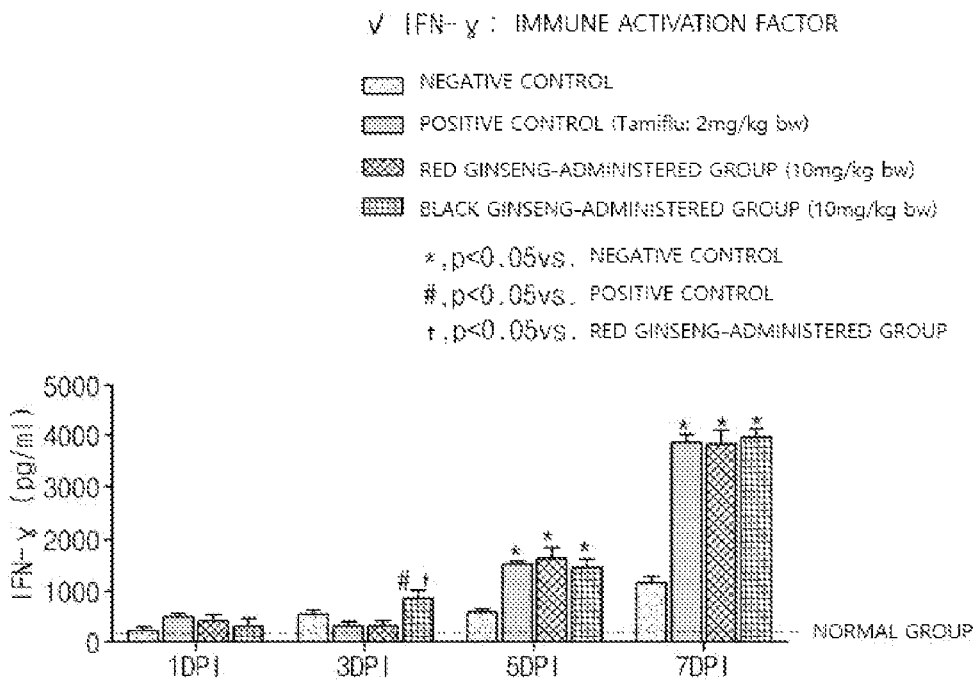

[FIG. 5c]
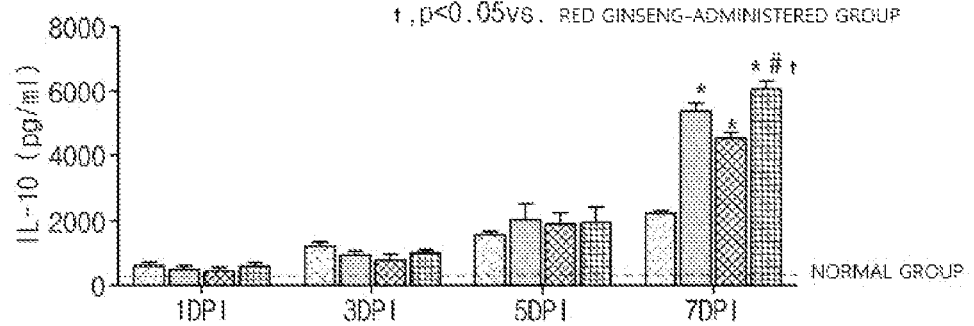

ANTI-INFLUENZA VIRUS COMPOSITION, COMPOSITION FOR TREATING RESPIRATORY DISEASES, AND ANTI-AGING COMPOSITION, COMPRISING DARK GINSENG EXTRACT

CROSS-REFERENCE TO RELATED APPLICATIONS

This application is a National Stage Application of PCT/KR2020/006589, filed 20 May 2020, which claims benefit of Serial No. 10-2019-0058675, filed 20 May 2019, in the Republic of Korea and which applications are incorporated herein by reference. To the extent appropriate, a claim of priority is made to each of the above disclosed applications.

TECHNICAL FIELD

The present invention relates to an anti-influenza virus composition, a composition for treating respiratory diseases, and an anti-aging composition, each of which comprises a dark ginseng extract.

BACKGROUND ART

Influenza viruses are divided into four types A, B, C, and D. Influenza type C viruses infect only humans but are not contagious. Influenza type D viruses do not cause disease in humans. Types A and B viruses are strong viruses that occur mainly in winter and infect the human respiratory organs to cause systemic symptoms.

Among them, serotypes of influenza A viruses are classified into subtypes based on two proteins on the surface of the virus, hemagglutinin (H) and neuraminidase (N). There are 18 different hemagglutinin subtypes and 11 different neuraminidase subtypes.

Influenza viruses mutate periodically, making target-drug therapy difficult. So, neuraminidase inhibitors zanamivir and oseltamivir have been developed and used as medicines. However, oseltamivir has caused a suicidal side effect recently.

Therefore, the development of natural substances, which increase human immunity and safe, will be an important means of reducing the mortality rate during an influenza pandemic.

Ginseng is a perennial herb belonging to the genus *Panax* of the Araliaceae family and is one of the herbal medicines used in oriental medicine. As physiologically active efficacies of general ginseng, an effect on the central nervous system, an anticancer effect (Patent Document 1), and the like have been reported. In particular, about 40 types of ginsenosides have been discovered so far, and it has been confirmed that they exerted a wide range of effects on the central nervous system, the endocrine system, the metabolic system, etc., and showed excellent effects in regulating body functions, that is, normalizing physiological functions. These ginsenosides have similar or opposite actions, and it is known that various effects are exerted by a specific component alone or through the interaction of several types of components.

The present inventors studied raw materials that can ameliorate diseases caused by influenza virus among processed products derived from ginseng, controlled the conditions for processing ginseng to prepare black ginseng having an increased content of ginsenosides present in trace amounts in ginseng, confirmed that the extract obtained from this black ginseng further ameliorated the symptoms of an influenza virus infection compared to that from red ginseng, had an excellent respiratory disease treatment efficacy, and had a very excellent anti-aging activity, thus completing the present invention.

PRIOR ART DOCUMENT (Patent Document 1) Korean Unexamined Publication No. 2010-0134463

DETAILED DESCRIPTION OF THE INVENTION

Technical Problem

An object of the present application is to provide a natural substance having an excellent anti-influenza virus effect.

An object of the present application is to provide a natural substance having an excellent therapeutic effect on respiratory diseases.

An object of the present application is to provide a natural substance having an excellent anti-aging activity.

Technical Solution

According to an aspect of the present application, there is provided a method for preparing a black ginseng extract.

In addition, another aspect of the present application provides a composition for preventing, inhibiting, or treating a disease caused by an influenza virus.

The composition for preventing, inhibiting, or treating a disease caused by an influenza virus of the present application includes a black ginseng extract as an active ingredient.

Another aspect of the present application provides a composition for preventing, inhibiting, or treating a respiratory disease.

Another aspect of the present application provides an anti-aging composition.

Hereinafter, the present application will be described in detail.

One embodiment of the present application provides a method for preparing a black ginseng extract enriched with ginsenosides Rk1 and Rg5, the method comprising: a step for steaming ginseng to prepare black ginseng; a step for extracting the prepared black ginseng with a solvent; and a step for maturing the obtained black ginseng extract.

The black ginseng extract is derived from black ginseng obtained by steaming ginseng multiple times.

The ginseng may be Korean ginseng (*Panax ginseng*), Canadian ginseng (*P. quinquefolius*), Chinese Ginseng (*P. notoginseng*), Bamboo ginseng (*P. japonicus*), Dwarf ginseng (*P. trifolium*), Himalayan ginseng (*P. pseudoginseng*), Vietnamese ginseng (*P. vietnamensis*), American ginseng (*Panax quinquefolium*), or the like. Ginseng is generally divided into white ginseng and red ginseng according to processing methods. White ginseng refers to ginseng obtained by drying unprocessed ginseng gathered right out of the field, that is, fresh ginseng, as it is. Red ginseng is ginseng obtained by steaming, drying, and processing fresh ginseng. The preparation process of red ginseng involves several chemical changes, such as saponin modification and amino acid changes. Ginsenoside components that do not exist in ginseng are generated by the heat applied during the red ginseng preparation process. The unique active components in red ginseng show cancer-preventive effect, cancer cell growth-inhibiting effect, blood pressure-lowering effect, brain nerve cell-protective effect, and learning ability-improving effect.

Black ginseng of the present application may be obtained by steaming nine times any one selected from the group consisting of ginseng leaves, young shoots, stems, stem shells, roots, root shells, seeds, fruits, immature fruits, mature fruits, flesh, pericarp, flowers, androecium, gynoecium, calyxes, stamens, petals, calyx pieces, carpels, and combinations thereof. The androecium represents the entire stamens in a flower, and the gynoecium represents the entire pistils in a flower. The carpel is a component that makes the pistil of a flower and represents a deformed form of a leaf, which is generally called a floral leaf. The ginseng may be, but is not limited to, ginseng roots. Other parts of ginseng steamed nine times and mixed may be used for the purpose of anti-influenza virus.

The ginsenoside Rk1 is represented by the following formula:

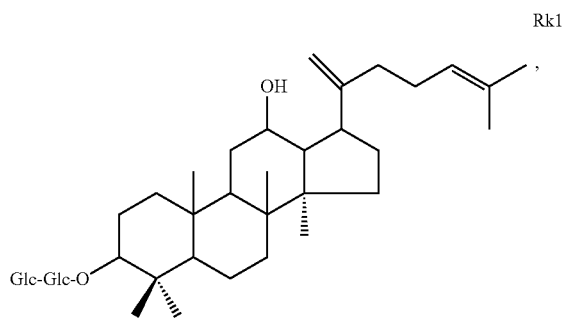

(wherein Glc represents a glycosyl residue.)

The ginsenoside Rg5 is represented by the following formula:

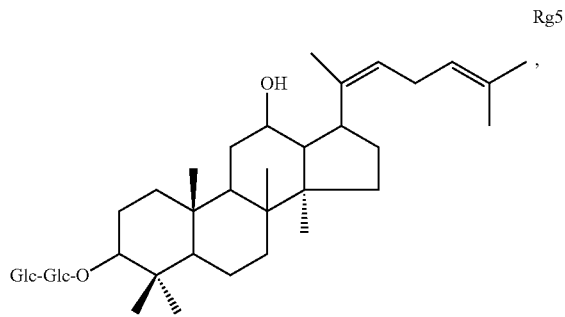

(wherein Glc represents a glycosyl residue.)

The steaming may be performed 3 to 12 times at 70° C. to 120° C.

The steaming may be performed at 75° C. to 115° C., 80° C. to 110° C., 85° C. to 105° C., 87° C. to 103° C., or 90° C. to 100° C. When performing steaming under the above temperature condition, the content of the active ingredient ginsenosides Rk1 and Rg5 increases, and substances harmful to health are not generated so that the quality can be optimized.

The steaming may be performed 3 to 11 times, 4 to 10 times, 5 to 9 times, 6 to 9 times, 7 to 9 times, 8 times, or 9 times. When performing steaming under the above condition of the number of steaming, the content of the active ingredient ginsenosides Rk1 and Rg5 increases, and substances harmful to health are not generated so that the quality can be optimized. As long as the black ginseng extract obtained by applying the steaming conditions of the present application exhibits anti-influenza virus activity against an influenza virus infection, the number of steaming can be variously applied.

The steaming time may be 1.5 hours to 6 hours, 2 hours or more, 2 hours to 6 hours, 2 hours to 5.5 hours, 2 hours to 5 hours, 2 hours to 4.5 hours, 2 hours to 4 hours, 2 hours to 3.5 hours, or 2 to 3 hours per steaming. When performing steaming under the above time condition, the content of the active ingredient ginsenosides Rk1 and Rg5 increases, and substances harmful to health are not generated so that the quality can be optimized.

The method for preparing the black ginseng extract may further include a step for drying the steamed ginseng each time completing steaming. Drying may be performed at 25° C. to 60° C., 27° C. to 58° C., or 30° C. to 55° C. In addition, drying may be performed for 10 hours to 30 hours, 12 hours to 28 hours, 12 hours to 26 hours, or 12 hours to 24 hours.

As used herein, the term "extract" refers to a material extracted by any method from a raw material, and is meant to include, without limitation, all of an extract thus extracted, a concentrate obtained therefrom, a dried product and powders of the concentrate.

The extract may be obtained by extraction from a raw material or a dried product thereof, and the raw material of the extract may be a raw material grown or a commercially available raw material, without limitation.

When the extract is obtained by extracting the raw material, conventionally known general extraction methods, such as solvent extraction, ultrasonic extraction, filtration and reflux extraction, may be used. The extract may be prepared by using solvent extraction or reflux extraction. The extraction process may be repeated several times, after which the extract may be further subjected to steps such as concentration or freeze-drying. For example, high concentration extract powders may be prepared by concentrating the obtained extract under reduced pressure to obtain a concentrate, freeze-drying the concentrate, and using a grinder. The extract also includes a fraction obtained by further fractionating the extract.

The extract may be obtained by using water, an organic solvent, or a mixture thereof as an extraction solvent. The organic solvent may be any one selected from the group consisting of an alcohol, a lower alcohol having 1 to 4 carbon atoms, hexane (n-hexane), ether, glycerol, propylene glycol, butylene glycol, ethyl acetate, methyl acetate, dichloromethane, chloroform, ethyl acetate, benzene, and a mixture thereof.

When a mixture of water and an organic solvent is used as an extraction solvent, the mixture of water and an organic solvent may be a mixture of water and a lower alcohol having 1 to 4 carbon atoms, and may be a mixture of water and ethanol. In this case, the solvent may be 20% (v/v) to 90% (v/v) aqueous ethanol solution, 25% (v/v) to 85% (v/v) aqueous ethanol solution, 30% (v/v) to 80% (v/v) aqueous ethanol solution, 20% (v/v) to 40% (v/v) aqueous ethanol solution, 30% (v/v) to 60% (v/v) aqueous ethanol solution, 35% (v/v) to 75% (v/v) aqueous ethanol solution, 40% (v/v) to 70% (v/v) aqueous ethanol solution, 45% (v/v) to 65% (v/v) aqueous ethanol solution, or 50% (v/v) to 80% (v/v) aqueous ethanol solution. When preparing the black ginseng extract, the extraction solvent may be added 4 times to 10 times, 5 times to 9 times, or 6 times to 8 times the raw material for extraction, black ginseng. The content of the active ingredient ginsenosides Rk1 and Rg5 increases during extraction under the above aqueous ethanol solution condition.

When preparing the black ginseng extract, extraction may be performed for 2 hours to 12 hours, 3 hours to 11 hours, 4 hours to 10 hours, 4 hours to 9 hours, or 4 hours to 8 hours. The content of the active ingredient ginsenosides Rk1 and Rg5 increases during extraction under the above time condition.

The black ginseng extract may be prepared by the following process. The black ginseng obtained by completing the final steaming and drying may be firstly extracted with 50% (v/v) to 80% (v/v) aqueous ethanol solution, the residue generated from the first extraction may be secondly extracted with the aqueous ethanol solution of the same concentration, the residue generated from the secondary extraction may be tertiarily extracted with 30% (v/v) to 60% (v/v) aqueous ethanol solution, and the residue generated from the tertiary extraction may be quaternarily extracted with 20% (v/v) to 40% (v/v) aqueous ethanol solution. The black ginseng extract may be each of the extracts obtained in each round and may be a mixture of the extracts obtained from the first to fourth extractions. The solvent used for each extraction round may have various concentrations. That is, to increase the content of the active ingredient ginsenosides Rk1 and Rg5, the extraction solvent may be used in various combinations.

The black ginseng extract may be 55 Brix % to 85 Brix %, 57 Brix % to 83 Brix %, 60 Brix % to 80 Brix %, 62 Brix % to 78 Brix %, or 65 Brix % to 75 Brix %. When the black ginseng extract is in the above Brix % concentration range, the quality, such as the content of active ingredient ginsenosides Rk1 and Rg5, is optimized, and the viscosity of the black ginseng extract is not too high, so the desired formulation can be prepared.

The method for preparing the black ginseng extract may further include a step for maturing the black ginseng extract after the extraction step.

The step for maturing the black ginseng extract may be performed at 80° C. or higher, 82° C. to 95° C., 84° C. to 93° C., 86° C. to 91° C., or 88° C. to 90° C. The content of ginsenosides Rk1 and Rg5 increases during maturing under the above temperature condition.

The step for maturing the black ginseng extract may be performed for 3 hours or more, 3 hours to 48 hours, 3 hours to 44 hours, 3 hours to 40 hours, 3 hours to 36 hours, 3 hours to 32 hours, 3 hours to 28 hours, or 3 to hours. The content of ginsenosides Rk1 and Rg5 increases during maturing under the above time condition.

The total content of ginsenosides Rk1 and Rg5 contained in the black ginseng extract may be 20 parts by weight to 90 parts by weight, 25 parts by weight to 85 parts by weight, 30 parts by weight to 80 parts by weight, 35 parts by weight to 75 parts by weight, 40 parts by weight to 70 parts by weight, 45 parts by weight to 65 parts by weight, or 50 parts by weight to 60 parts by weight, based on 100 parts by weight of the total content of ginsenosides Rb1, Rb2, Rc, Rd, Re, Rg1, Rg3(s), Rk1, Rg5, and Rh1(s). When the total content of ginsenosides Rk1 and Rg5 is within the above range, the effects of preventing, inhibiting, or treating a disease caused by an influenza virus of the black ginseng extract are excellent.

In the method for preparing the black ginseng extract, pressure is not applied during the steaming. Pressure is not applied separately during the steaming, so harmful substances such as benzopyrene are not generated. Thus, the black ginseng extract of the present application has excellent quality in terms of safety.

The black ginseng is prepared by steaming ginseng. A black ginseng extract having a high content of ginsenosides Rk1 and Rg5 can be obtained through extraction of the prepared black ginseng and maturing. For example, black ginseng was prepared by steaming 3 to 12 times at 70° C. to 120° C., with the condition of 2 hours or more per steaming. To this black ginseng, 4 to 10 times the weight of the black ginseng of water, a lower alcohol having 1 to 4 carbon atoms, or a mixed solvent thereof was added, and the black ginseng was subjected to the extraction for 2 to 12 hours to obtain a black ginseng extract. The black ginseng extract was concentrated, and the black ginseng concentrate was matured at 80° C. or higher for 3 hours or longer. As a result, the total content of ginsenosides Rk1 and Rg5, which are known to be not contained or contained in trace amounts in red ginseng, was 20 parts by weight to 90 parts by weight, based on 100 parts by weight of the total content of ginsenosides Rb1, Rb2, Rc, Rd, Re, Rg1, Rg3(s), Rk1, Rg5, and Rh1(s), and was significantly higher than that in the red ginseng extract.

An embodiment of the present application provides a composition for preventing, inhibiting, or treating a disease caused by an influenza virus, the composition comprising a black ginseng extract containing ginsenosides Rk1 and Rg5 as an active ingredient, wherein the total content of ginsenosides Rk1 and Rg5 is 20 parts by weight to 90 parts by weight, based on 100 parts by weight of the total content of ginsenosides Rb1, Rb2, Rc, Rd, Re, Rg1, Rg3(s), Rk1, Rg5, and Rh1(s).

The total content of ginsenosides Rk1 and Rg5 may be 25 parts by weight to 85 parts by weight, 30 parts by weight to 80 parts by weight, 35 parts by weight to 75 parts by weight, 40 parts by weight to 70 parts by weight, 45 parts by weight to 65 parts by weight, or 50 parts by weight to 60 parts by weight, based on 100 parts by weight of the total content of ginsenosides Rb1, Rb2, Rc, Rd, Re, Rg1, Rg3(s), Rk1, Rg5, and Rh1(s). When the total content of ginsenosides Rk1 and Rg5 is within the above range, the effects of preventing, inhibiting, or treating a disease caused by influenza viruses of the black ginseng extract are excellent.

The total content of ginsenosides Rk1 and Rg5 contained in the black ginseng extract may be 9 mg/g or more, 9 mg/g to 30 mg/g, 9 mg/g to 28 mg/g, 9 mg/g to 26 mg/g, 9 mg/g to 24 mg/g, 9 mg/g to 22 mg/g, 9.1 mg/g to 20 mg/g, 9.1 mg/g to 18 mg/g, 9.2 mg/g to 16 mg/g, 9.2 mg/g to 14 mg/g, or 9.2 mg/g to 12 mg/g. When the total content of ginsenosides Rk1 and Rg5 is within the above range, the effects of preventing, inhibiting, or treating a disease caused by influenza viruses of the black ginseng extract are excellent.

In a specific example of the present application, influenza A virus (H1N1) was inoculated into mice administered with black ginseng extract containing 9.29 mg/g of ginsenosides Rk1 and Rg5 once a day at a concentration of 10 mg/Kg/day. Then, the black ginseng extract was administered at a concentration of 10 mg/Kg/day once a day for a week after inoculation. As a result, all the black ginseng extract-administered mice survived, and the fatality rate was shown to be 0%, which is the same as that of the Tamiflu-administered positive control group. Meanwhile, when the experiment was performed in the same manner, except that the red ginseng extract (containing 0.58 mg/g of ginsenosides Rk1 and Rg5) was administered instead of the black ginseng extract, mice died due to virus infection, and the fatality rate was 50%.

The effects of preventing, inhibiting, or treating a disease caused by an influenza virus may be lowering the fatality rate after influenza virus infection, or preventing or ameliorating lung tissue damage caused by an influenza virus infection, or after influenza virus infection, highly expressing the immune cell proliferation factor (GM-CSF) or immune activation factor (IFN-γ) highly in the early stage of infection to enhance the proliferation and activities of the immune cells at the early stage of infection, thereby killing viruses, or highly expressing the immune inhibition factor (IL-10) at the late stage of the infection to normalize the activated immune system.

The black ginseng extract may further include acidic polysaccharides and polyphenols.

The acidic polysaccharides may be contained in an amount of 1 mg/g or more, 1 mg/g to 20 mg/g, 1 mg/g to 18 mg/g, 1 mg/g to 16 mg/g, 1 mg/g to 14 mg/g, 1 mg/g to 12 mg/g, 1.5 mg/g to 10 mg/g, 1 mg/g to 8 mg/g, 2 mg/g to 6 mg/g, 1 mg/g to 4 mg/g, or 2.5 mg/g to 4 mg/g. When the acidic polypeptides are contained within the above range, a synergistic effect between the acidic polypeptides and ginsenosides Rk1 and Rg5 contained in the black ginseng increases. Thus, the effects of preventing, inhibiting, or treating a disease caused by an influenza virus are excellent.

The polyphenols may be contained in an amount of 15 mg/g or more, 15 mg/g to 40 mg/g, 15 mg/g to 38 mg/g, 15 mg/g to 36 mg/g, 16 mg/g to 34 mg/g, 17 mg/g to 32 mg/g, 18 mg/g to 30 mg/g, 19 mg/g to 28 mg/g, 20 mg/g to 26 mg/g, or 20 mg/g to 24 mg/g. When the polyphenols are contained within the above range, a synergistic effect between the polyphenols and ginsenosides Rk1 and Rg5 contained in the black ginseng increases. Thus, the effects of preventing, inhibiting, or treating a disease caused by an influenza virus are excellent.

The influenza virus may be an influenza A virus. The influenza A virus may be H1N1, and the H1N1 may be A/California/04/2009 (H1N1).

The composition for preventing, inhibiting, or treating a disease caused by the influenza virus, comprising the black ginseng extract containing ginsenosides Rk1 and Rg5 of the present application as an active ingredient may be a food or pharmaceutical composition.

The disease caused by the influenza virus may include, without limitation, all diseases and lesions that may be caused by an influenza virus infection. For example, the disease may be any one or more selected from the group consisting of cold, flu, cough, sneezing, runny nose, myalgia, pharyngolaryngitis, nasal obstruction, laryngitis, sore throat, hoarseness, headache, sinus pain, rhinitis, pharyngitis, bronchitis, asthma, fever, dyspnea, whole body lethargy, and chills.

As used herein, the term "prevention" refers to any action resulting in the delay of the occurrence of the disease caused by the influenza virus owing to the composition of the present application.

As used herein, the term "inhibition" refers to any action resulting in the decrease in the occurrence of the disease caused by the influenza virus owing to the composition of the present application.

As used herein, the term "treatment" refers to any action resulting in the alleviation of the symptoms of the disease caused by the influenza virus or benefit owing to the composition of the present application.

As used herein, the term "administration" means introducing a predetermined substance to a subject in any suitable way. The composition of the present application can be administered through any general route that can reach an in vivo target. The route of administration of the composition of the present application is not particularly limited but may be oral or parenteral. The administration of the present application may be performed 1 to 4 times, 2 to 3 times, or 2 times a day. In addition, the administration of the present application may be performed for a period of 4 weeks or more, 8 weeks or more, 4 weeks to 12 weeks, or 8 weeks to 12 weeks.

The dosage of the black ginseng extract containing ginsenosides Rk1 and Rg5 contained in the composition for preventing, inhibiting, or treating the disease caused by the influenza virus depends on the patient's condition and weight, the degree of the disease, drug form, and route and period of the administration and may be appropriately selected depending on the circumstances. For example, the black ginseng extract containing ginsenosides Rk1 and Rg5 may be administered at a dose of 0.0001 to 1000 mg/kg, 0.001 to 700 mg/kg, 0.01 to 500 mg/kg, 0.1 to 100 mg/kg, or 1 to 100 mg/kg per day. The administration may be performed once or several times per day in a divided manner. The dosage of the black ginseng extract containing ginsenosides Rk1 and Rg5 of the present application may be increased or decreased according to the route of administration, the degree of the disease, sex, weight, age, or the like. Accordingly, the above dosage does not limit the scope of the present application in any way.

The food composition of the present application may be provided in the form of a powder, a granule, a tablet, a capsule, syrup, or a beverage. The food composition may be used with other food or food additives, in addition to the black ginseng extract containing ginsenosides Rk1 and Rg5 of the present application, which is the active ingredient. The mixing amount of the active ingredient may be determined appropriately depending on the purpose of use, for example, prevention, health, or therapeutic treatment.

The black ginseng extract containing ginsenosides Rk1 and Rg5 may be contained in the food composition in an amount of 0.001 wt % to 60 wt %, for example, 0.01 wt % to 50 wt %, 0.1 wt % to 45 wt %, 1 wt % to 40 wt %, or 1 wt % to 20 wt %. When the content of the black ginseng extract in the cosmetic composition is less than 0.001 wt %, the anti-influenza virus activity of the black ginseng extract may not be sufficiently exhibited. When it exceeds 60 wt %, the effect of the black ginseng extract may be relatively low relative to the introduced concentration, but there is no problem in terms of safety, and thus the black ginseng extract can be used in an amount greater than the above range.

There is no particular limitation on the type of the food of the present application. Examples of the food of the present application include meat, sausages, bread, chocolate, candies, snacks, confectioneries, pizza, ramen, other noodles, gums, dairy products including ice cream, various soups, beverages, teas, drinks, alcoholic beverages, and vitamin complexes.

The pharmaceutical composition of the present application may further include an appropriate carrier, an excipient, or a diluent, commonly used for preparing the pharmaceutical composition.

Examples of the carrier, the excipient, or the diluent that can be used for the pharmaceutical composition of the present application include lactose, dextrose, sucrose, sorbitol, mannitol, xylitol, erythritol, maltitol, starch, acacia rubber, alginate, gelatin, calcium phosphate, calcium silicate, cellulose, methylcellulose, microcrystalline cellulose, polyvinylpyrrolidone, water, methyl hydroxybenzoate, propyl hydroxybenzoate, talc, magnesium stearate, or mineral oil.

The pharmaceutical composition of the present invention may be formulated and used in the form of oral formulations, such as powders, granules, tablets, capsules, suspensions, emulsions, syrups, aerosols, or the like, external applications, suppositories, and sterilized injection solutions, respectively, according to conventional methods. Since the influenza virus is transmitted through the mucous membrane, the pharmaceutical composition of the present application may be provided in the form of an aerosol, powders, gels, an ointment, or a drop for easy application to the mucous membrane. The mucous membrane may be, but not limited to, a nasal mucosa, an oral mucosa, an airway mucosa, or an eye mucosa.

For preparation into formulations, a diluent or an excipient, such as a commonly used filler, a bulking agent, a binder, a wetting agent, a disintegrating agent, a surfactant, or the like may be used. Solid formulations for oral administration include tablets, pills, powders, granules, capsules, etc. These solid formulations may be prepared by mixing the compound with at least one excipient, for example, starch, calcium carbonate, sucrose, lactose, gelatin, etc.

Furthermore, in addition to simple excipients, lubricants, such as magnesium stearate and talc are also used. Liquid formulations for oral administration include a suspension, a liquid for internal use, an emulsion, syrup, and the like. In addition to water and liquid paraffin, which are commonly used simple diluents, various excipients, for example, a wetting agent, a sweetener, a flavoring agent, a preserving agent, or the like may be added.

Formulations for parenteral administration include a sterilized aqueous solution, a non-aqueous solvent, a suspension, an emulsion, a lyophilized formulation, and a suppository formulation. As the non-aqueous solvent or the suspension, propylene glycol, polyethylene glycol, a plant oil such as olive oil, an injectable ester such as ethylolate, or the like may be used. As a base for suppositories, witepsol, macrogol, tween 61, cacao butter, laurin butter, glycerogelatin, or the like may be used.

Solid formulations for oral administration include tablets, pills, powders, granules, capsules, etc. These solid formulations are prepared by mixing the pharmaceutical composition of the present application with at least one excipient, for example, starch, calcium carbonate, sucrose, lactose, gelatin, etc. Furthermore, in addition to simple excipients, lubricants, such as magnesium stearate and talc may also be used.

Liquid formulations for oral administration include a suspension, a liquid for internal use, an emulsion, syrup, and the like. In addition to water and liquid paraffin, which are commonly used simple diluents, various excipients, for example, a wetting agent, a sweetener, a flavoring agent, a preserving agent, or the like may be added.

Formulations for skin administration may be dusting powders, emulsions, suspensions, oils, sprays, ointments, cream pastes, gels, foams, or solutions. The pharmaceutical formulation of the present application may be an anhydrous ointment, and may contain paraffin that is suitable for local application and is in a liquid state at body temperature, particularly, low-viscosity paraffin, or may contain the natural fats or partially synthesized fats, for example, coconut fatty acid triglyceride, hydrogenated oil, for example, hydrogenated peanut oil or caster oil, partial fatty acid ester of glycerol, for example, glycerol monostearate and distearate, silicone, for example, polymethylsiloxane, such as hexamethyldisiloxane or octamethyltrisiloxane. For example, the pharmaceutical formulation may contain a fatty alcohol, which is associated with an aqueous cream and serves to increase the moisture absorption capacity, and sterols, wool wax, other emulsifying agents and/or other additives.

The dosage of the black ginseng extract containing ginsenosides Rk1 and Rg5 contained in the pharmaceutical composition of the present application is as described above.

The pharmaceutical composition of the present application may be administered to mammals such as rats, mice, livestock, humans, and the like through various routes. Administration may be performed through, for example, oral, rectal, intravenous, intramuscular, subcutaneous, endobronchial inhalation, intrauterine dural, or intracerebroventricular injection.

The composition for preventing, inhibiting, or treating the disease caused by the influenza virus of the present application may contain one or more active ingredients that result in amelioration, alleviation, treatment, or prevention of the disease caused by the influenza virus, in addition to the black ginseng extract containing ginsenosides Rk1 and Rg5.

For the amelioration, alleviation, treatment, or prevention of the disease caused by the influenza virus, the composition for preventing, inhibiting, or treating the disease caused by the influenza virus of the present application may be used alone or in combination with surgery, hormone therapy, medication, and methods of using biological response modifiers.

According to another aspect of the present application, there is provided a method for preventing, inhibiting, or treating a disease caused by an influenza virus, comprising a step for administering to a subject a composition containing a black ginseng extract containing ginsenosides Rk1 and Rg5 as an active ingredient.

The composition for preventing, inhibiting, or treating a disease caused by an influenza virus and administration are as described above.

The black ginseng extract containing ginsenosides Rk1 and Rg5 of the present application may be administered to a subject in need thereof in an effective amount.

The subject in need thereof may be a subject in need of prevention, inhibition, or treatment of the disease caused by an influenza virus infection.

The term "subject" herein may be an animal, including a human or an animal other than a human.

Another embodiment of the present application provides a composition for preventing, inhibiting, or treating a respiratory disease, the composition comprising a black ginseng extract containing ginsenosides Rk1 and Rg5 as an active ingredient, wherein the total content of ginsenosides Rk1 and Rg5 is 20 parts by weight to 90 parts by weight, based on 100 parts by weight of the total content of ginsenosides Rb1, Rb2, Rc, Rd, Re, Rg1, Rg3(s), Rk1, Rg5, and Rh1(s).

The total content of ginsenosides Rk1 and Rg5 may be 25 parts by weight to 85 parts by weight, 30 parts by weight to 80 parts by weight, 35 parts by weight to 75 parts by weight, 40 parts by weight to 70 parts by weight, 45 parts by weight to 65 parts by weight, or 50 parts by weight to 60 parts by weight, based on 100 parts by weight of the total content of ginsenosides Rb1, Rb2, Rc, Rd, Re, Rg1, Rg3(s), Rk1, Rg5, and Rh1(s). When the total content of ginsenosides Rk1 and Rg5 is within the above range, the effects of preventing, inhibiting, or treating a respiratory disease of the black ginseng extract are excellent.

The total content of ginsenosides Rk1 and Rg5 contained in the black ginseng extract may be 9 mg/g or more, 9 mg/g to 30 mg/g, 9 mg/g to 28 mg/g, 9 mg/g to 26 mg/g, 9 mg/g to 24 mg/g, 9 mg/g to 22 mg/g, 9.1 mg/g to 20 mg/g, 9.1 mg/g to 18 mg/g, 9.2 mg/g to 16 mg/g, 9.2 mg/g to 14 mg/g, or 9.2 mg/g to 12 mg/g. When the total content of ginsenosides Rk1 and Rg5 is within the above range, the effects of preventing, inhibiting, or treating a respiratory disease of the black ginseng extract are excellent.

The effects of preventing, inhibiting, or treating a respiratory disease may be due to actions of decreasing the accumulation of fine dust or ultrafine dust in the respiratory organs, such as the bronchial tubes, pharynx, larynx, nasal cavity, sinuses, and lungs, or of regulating or decreasing the activity of immune cells in the respiratory organs.

The black ginseng extract may further include acidic polysaccharides and polyphenols.

The acidic polysaccharides may be contained in an amount of 1 mg/g or more, 1 mg/g to 20 mg/g, 1 mg/g to 18 mg/g, 1 mg/g to 16 mg/g, 1 mg/g to 14 mg/g, 1 mg/g to 12 mg/g, 1.5 mg/g to 10 mg/g, 1 mg/g to 8 mg/g, 2 mg/g to 6 mg/g, 1 mg/g to 4 mg/g, or 2.5 mg/g to 4 mg/g. When the acidic polypeptides are contained within the above range, a synergistic effect between the acidic polypeptides and ginsenosides Rk1 and Rg5 contained in the black ginseng increases. Thus, the effects of preventing, inhibiting, or treating a respiratory disease are excellent.

The polyphenols may be contained in an amount of 15 mg/g or more, 15 mg/g to 40 mg/g, 15 mg/g to 38 mg/g, 15 mg/g to 36 mg/g, 16 mg/g to 34 mg/g, 17 mg/g to 32 mg/g, 18 mg/g to 30 mg/g, 19 mg/g to 28 mg/g, 20 mg/g to 26 mg/g, or 20 mg/g to 24 mg/g. When the polyphenols are contained within the above range, a synergistic effect between the polyphenols and ginsenosides Rk1 and Rg5 contained in the black ginseng increases. Thus, the effects of preventing, inhibiting, or treating a respiratory disease are excellent.

The composition for preventing, inhibiting, or treating a respiratory disease, comprising the black ginseng extract containing ginsenosides Rk1 and Rg5 of the present application as an active ingredient may be a food or pharmaceutical composition.

The respiratory disease may include, without limitation, any disease occurring in the respiratory organs. For example, it may be any one or more selected from the group consisting of asthma, chronic obstructive pulmonary disease, bronchitis, pharyngitis, laryngitis, rhinitis, sinusitis, and pneumonia.

The respiratory disease may be a disease caused by fine dust or ultrafine dust. Fine dust refers to airborne particulate matter with a size that is invisible to the naked eye and includes particulate matter with a diameter of 50 μm or less, 45 μm or less, 30 μm or less, or 10 μm or less. In addition, ultrafine dust means dust smaller than fine dust and refers to particulate matter with a diameter of 2.5 μm or less. Fine dust and ultrafine dust may consist of ionic components, such as nitrate ($NO_3^-$), ammonium ion ($NH_4^+$), sulfate ($SO_4^{2-}$), and the like, and a carbon compound, or a metal compound, or the like.

The contents described herein concerning the composition for preventing, inhibiting, or treating the disease caused by the influenza virus, which is another embodiment of the present application, may be applied to the composition for preventing, inhibiting, or treating the respiratory disease. The contents common between the two will not be described redundantly to avoid undue complexity of the specification. For example, the meaning of terms "prevention", "inhibition", "treatment", and "administration", and the contents of "dosage of the black ginseng extract", "food composition", "pharmaceutical composition", "administration method of the pharmaceutical composition", "containing active ingredients other than the black ginseng extract", and "use of the composition alone or in combination with other methods" can be applied to the composition for preventing, inhibiting, or treating the respiratory disease.

According to another aspect of the present application, there is provided a method for preventing, inhibiting, or treating a respiratory disease, comprising a step for administering to a subject a composition containing a black ginseng extract containing ginsenosides Rk1 and Rg5 as an active ingredient.

The composition for preventing, inhibiting, or treating a respiratory disease and administration are as described above.

The black ginseng extract containing ginsenosides Rk1 and Rg5 of the present application may be administered to a subject in need thereof in an effective amount.

The subject in need thereof may be a subject in need of prevention, inhibition, or treatment of the respiratory disease.

The term "subject" may be an animal, including a human or an animal other than a human.

Another embodiment of the present application provides an anti-aging composition comprising a black ginseng extract containing ginsenosides Rk1 and Rg5 as an active ingredient, wherein the total content of ginsenosides Rk1 and Rg5 is 20 parts by weight to 90 parts by weight, based on 100 parts by weight of the total content of ginsenosides Rb1, Rb2, Rc, Rd, Re, Rg1, Rg3 (s), Rk1, Rg5, and Rh1(s).

The total content of ginsenosides Rk1 and Rg5 may be 25 parts by weight to 85 parts by weight, 30 parts by weight to 80 parts by weight, 35 parts by weight to 75 parts by weight, 40 parts by weight to 70 parts by weight, 45 parts by weight to 65 parts by weight, or 50 parts by weight to 60 parts by weight, based on 100 parts by weight of the total content of ginsenosides Rb1, Rb2, Rc, Rd, Re, Rg1, Rg3(s), Rk1, Rg5, and Rh1(s). When the total content of ginsenosides Rk1 and Rg5 is within the above range, the anti-aging effect of the black ginseng extract is excellent.

The total content of ginsenosides Rk1 and Rg5 contained in the black ginseng extract may be 9 mg/g or more, 9 mg/g to 30 mg/g, 9 mg/g to 28 mg/g, 9 mg/g to 26 mg/g, 9 mg/g to 24 mg/g, 9 mg/g to 22 mg/g, 9.1 mg/g to 20 mg/g, 9.1 mg/g to 18 mg/g, 9.2 mg/g to 16 mg/g, 9.2 mg/g to 14 mg/g, or 9.2 mg/g to 12 mg/g. When the total content of ginsenosides Rk1 and Rg5 is within the above range, the anti-aging effect of the black ginseng extract is excellent.

In the present application, the anti-aging effect can be confirmed through the results of measuring the expression of genes and proteins, such as aging-related indicators p15INK4b, p16INK4a, p21, p27, p38, p53, CDK1, CDK2, mechanistic target of rapamycin (mTOR), sirtuin 1 (SIRT1), or β-galactosidase (β-gal) staining.

The black ginseng extract may further include acidic polysaccharides and polyphenols.

The acidic polysaccharides may be contained in an amount of 1 mg/g or more, 1 mg/g to 20 mg/g, 1 mg/g to 18 mg/g, 1 mg/g to 16 mg/g, 1 mg/g to 14 mg/g, 1 mg/g to 12 mg/g, 1.5 mg/g to 10 mg/g, 1 mg/g to 8 mg/g, 2 mg/g to 6 mg/g, 1 mg/g to 4 mg/g, or 2.5 mg/g to 4 mg/g. When the acidic polypeptides are contained within the above range, a synergistic effect between the acidic polypeptides and ginsenosides Rk1 and Rg5 contained in the black ginseng increases. Thus, the anti-aging effect is excellent.

The polyphenols may be contained in an amount of 15 mg/g or more, 15 mg/g to 40 mg/g, 15 mg/g to 38 mg/g, 15 mg/g to 36 mg/g, 16 mg/g to 34 mg/g, 17 mg/g to 32 mg/g, 18 mg/g to 30 mg/g, 19 mg/g to 28 mg/g, 20 mg/g to 26 mg/g, or 20 mg/g to 24 mg/g. When the polyphenols are contained within the above range, a synergistic effect between the polyphenols and ginsenosides Rk1 and Rg5 contained in the black ginseng increases. Thus, the anti-aging effect is excellent.

The anti-aging composition comprising the black ginseng extract containing ginsenosides Rk1 and Rg5 of the present application as an active ingredient may be a food or pharmaceutical composition.

The contents described herein concerning the composition for preventing, inhibiting, or treating the disease caused by the influenza virus, which is another embodiment of the present application, may be applied to the anti-aging composition. The contents common between the two will not be described redundantly to avoid undue complexity of the specification. For example, the meaning of terms "prevention", "inhibition", "treatment", and "administration", and the contents of "dosage of the black ginseng extract", "food composition", "pharmaceutical composition", "administration method of the pharmaceutical composition", "containing active ingredients other than the black ginseng extract" and "use of the composition alone or in combination with other methods" can be applied to the anti-aging composition.

According to another aspect of the present application, there is provided a method for preventing, inhibiting, or ameliorating aging, comprising a step for administering to a subject a composition containing a black ginseng extract containing ginsenosides Rk1 and Rg5 as an active ingredient.

As used herein, the term "amelioration" refers to any action ameliorating the symptoms of aging owing to the composition of the present application.

The anti-aging composition and administration are as described above.

The black ginseng extract containing ginsenosides Rk1 and Rg5 of the present application may be administered to a subject in need thereof in an effective amount.

The subject in need thereof may be a subject in need of prevention, inhibition, or amelioration of aging.

The term "subject" may be an animal, including a human or an animal other than a human.

Effects of the Invention

The black ginseng extract according to the method for preparing the black ginseng extract of the present application reduces the fatality rate of influenza virus-infected subjects compared to red ginseng, inhibits or ameliorates lung tissue damage, and enhances the proliferation and activities of the immune cells at the early stage of the influenza virus infection, and normalizes the activated immune system at the late stage of the infection. Thus, the black ginseng extract has the excellent effect of ameliorating the symptoms of the infection caused by the influenza virus. Therefore, the black ginseng extract of the present application can be usefully used as an active ingredient in various types of food and pharmaceutical compositions to ameliorate the symptoms of the infection caused by the influenza virus.

In addition, since the black ginseng extract of the present application is excellent in preventing, inhibiting, or treating the respiratory disease, it can be used as an active ingredient in food or pharmaceutical compositions for preventing or treating the respiratory disease.

In addition, since the black ginseng extract of the present application is very effective in inhibiting, preventing, or ameliorating aging, it can be usefully used as an active ingredient in anti-aging food and pharmaceutical compositions.

However, effects of the present application are not limited to the above-mentioned effects and other effects not mentioned will be clearly understood from the following description by a person skilled in the art.

BRIEF DESCRIPTION OF THE DRAWINGS

FIGS. 1a to 1c show changes in ginsenosides according to the steaming time during the preparation of the black ginseng.

FIGS. 2a to 2c show changes in ginsenosides according to the maturing temperature and the maturing time of the black ginseng concentrate.

FIG. 3 is a graph showing the fatality rate after the virus infection of the standardized black ginseng concentrate treatment group.

FIG. 4 shows the degree of lung tissue damage after the virus infection of the standardized black ginseng concentrate treatment group.

FIGS. 5a to 5c are graphs showing the degree of immune activation factor production after the virus infection of the standardized black ginseng concentrate treatment group.

BEST MODE FOR CARRYING OUT THE INVENTION

Hereinafter, the present invention will be described in detail through Preparation Examples and Experimental examples.

However, the following Preparation Examples and Experimental examples merely illustrate the present invention, and the contents of the present application are not limited by the following Examples and Experimental examples.

Preparation Example 1. Preparation of Black Ginseng 1-1. Preparation of Red Ginseng (One Steaming-Drying Black Ginseng)

Four-year-old fresh ginseng roots were placed into a screw washer (Samgak fmc, South Korea) and washed once for 3 minutes to remove soil or foreign substances. The washed fresh ginseng roots were placed in a steamer and first steamed at 98° C. for 2 hours, excluding the preheating time. The steamer was cooled to a temperature of 55° C. Then, the steamed fresh ginseng roots were taken out of the steamer. The internal temperature of a hot air dryer was maintained at 55° C., and then, the steamed fresh ginseng roots were added and dried for about 18 hours. The dried red ginseng was moved to a sun-drying place (a drying facility under natural light) and dried for over a month. Through the above process, 930 kg of red ginseng (one steaming-drying) was prepared.

1-2. Preparation of Nine Times Steaming-Nine Times Drying Black Ginseng 930 kg of red ginseng prepared in Preparation Example 1-1 above was steamed under the same steaming and drying conditions as in Preparation Example 1-1. The above-described steaming and drying processes were repeatedly performed and were referred to as two times to nine times steaming-drying depending on the number of repetitions. As the steaming and drying were repeated, the color gradually became closer to black. Through the above process, 853.8 kg of nine times steaming-nine times drying black ginseng was prepared. When preparing the black ginseng extract of Preparation Example 2 or the black ginseng concentrate of Preparation Example 3, nine times steaming-nine times drying black ginseng was used as a raw material.

Preparation Example 2. Preparation of Black Ginseng Extract

Each of 284.6 kg of the red ginseng prepared in Preparation Example 1-1 and 284.6 kg of the black ginseng prepared in Preparation Example 1-2 was taken and pulverized. Then, 70% (v/v) aqueous ethanol solution corresponding to 6 times the weight of the pulverized product was added, and the first extraction was performed for 6 hours at 82° C. The extraction residue generated from the first extraction was subjected to the second extraction under the same conditions as in the first extraction. 50% (v/v) aqueous ethanol solution corresponding to 6 times the weight of the extraction residue generated from the second extraction was added, and the third extraction was performed for 6 hours at 85° C. 30% (v/v) aqueous ethanol solution corresponding to 6 times the weight of the extraction residue generated from the third extraction was added, and the fourth extraction was performed for 6 hours at 90° C. Purified water corresponding to 6 times the weight of the extraction residue generated from the fourth extraction was added, and the fifth extraction was performed for 6 hours at 95° C.

Preparation Example 3. Preparation of Black Ginseng Concentrate

The first to fourth red ginseng extracts and the first to fourth black ginseng extracts obtained in Preparation Example 2 each were filtered to separate the extracts from the extraction residues. For each raw material, only the separated extract was placed in a concentrator and concentrated at 55° C. in a vacuum concentrator for 4 hours. 231 kg of 70 Brix % red ginseng concentrate was obtained, and 212 kg of 70 Brix % black ginseng concentrate was obtained. The obtained red ginseng concentrate and black ginseng concentrate were used as samples for the following component analysis and influenza A virus experiment.

Experimental Example 1. Confirmation of Changes in Ginsenosides Content in Black Ginseng Concentrate According to Steaming Time Nine times steaming-drying was carried out in the same manner as in the steaming conditions of Preparation Example 1-1 except that the steaming time was changed to 1 hour, 2 hours, and 3 hours. The prepared red ginseng was extracted and concentrated according to Preparation Examples 2 and 3. The ginsenosides content was measured in the same manner as in Experimental Example 3 below.

When the steaming time was set to 1 hour, it was confirmed that ginsenosides Rk1 and Rg5 did not exist even after nine times steaming-drying as shown in FIG. 1a. Meanwhile, when the steaming time was set to 2 hours, the content of ginsenosides Rk1 and Rg5 was significantly increased compared to the black ginseng concentrate prepared with the steaming time of 1 hour (FIG. 1b). In addition, when the steaming time was set to 3 hours, the content of ginsenosides Rk1 and Rg5 was increased compared to the case where the steaming time was set to 2 hours (FIG. 1c).

Experimental Example 2. Confirmation of Changes in Ginsenosides Content in Black Ginseng Concentrate According to Maturing Temperature or Maturing Time The black ginseng concentrate obtained in Preparation Example 3 was placed in a 2 ml vial and matured in a water bath for 8 hours at 70° C., 80° C., and 90° C., respectively, and the changes in ginsenosides content over time were measured. The ginsenosides content was measured in the same manner as in Experimental Example 3.

As a result, when maturing the black ginseng concentrate at 70° C., the ginsenosides content did not increase even after 8 hours of maturing (FIG. 2a). Meanwhile, when maturing the black ginseng concentrate at 70° C., the content of ginsenosides Rk1 and Rg5 increased over time. Even at 90° C., the content of ginsenosides Rk1 and Rg5 increased over time as in the case of maturing at 80° C.

In addition, as can be seen from FIGS. 2b to 2c, the content of ginsenosides Rk1 and Rg5 was changed according to the maturing time. The content of ginsenosides Rk1 and Rg5 increased in the black ginseng concentrate matured under the condition of 80° C. or higher for 3 hours or more.

Experimental Example 3. Analysis of Ginsenoside Components in Black Ginseng Concentrate The analysis of ginsenoside components present in the red ginseng concentrate or the black ginseng concentrate obtained in Preparation Example 3 was performed using HPLC. As a sample, a solution obtained by diluting the black ginseng concentrate obtained in Preparation Example 3 in methanol at a ratio of 1/30, followed by filtration through a 0.45 µm filter, was used. HPLC 1260 (DAD) (Agilent, USA) was used. VENUSIL XBP C18 column (4.6 MM×250 MM, 5.0 µm) was used, and as mobile phases, LC-grade water was used as solvent A and acetonitrile as solvent B. The column temperature was maintained at 35° C. The gradient conditions were as follows: 0-3.8 min, a flow rate of 1 ml/min, hold at 30% B; 3.81-4.5 min, a flow rate of 0.5 ml/min, hold at 30% B; 4.51-6 min, a flow rate of 1.2 ml/min, 30% B increased to 42% B; 7.5-13 min, a flow rate of 0.5 ml/min, hold at 42% B; until 18 min, a flow rate of 0.5 ml/min, increased to 47.4% B; 18.1-25 min, a flow rate of 1 ml/min, increased to 55% B; 30-32 min, a flow rate of 1 ml/min, increased to 60% B; 42-50 min, a flow rate of 1 ml/min, 60% B increased to 90% B; and 50.1-53 min, a flow rate of 1 ml/min, hold at 30% B. The results of the component analysis are shown below (unit: mg/g).

TABLE 1

| | Rb1 | Rb2 | Rc | Rd | Re | Rg1 | Rg3 (S) | Rk1 | Rg5 | Rh1 (S) |
|---|---|---|---|---|---|---|---|---|---|---|
| Red ginseng | 4.91 | 2.21 | 3.23 | 1.75 | 3.74 | 1.29 | 0.42 | 0.12 | 0.46 | 0.43 |
| Black ginseng | 0.83 | 0.00 | 0.00 | 0.00 | 1.34 | 0.00 | 4.12 | 4.75 | 4.54 | 0.94 |

As a result of analyzing ginsenosides in the black ginseng concentrate, it was confirmed that 0.832 mg/g of Rb1, 1.157 mg/g of Rf, 1.008 mg/g of Rg2(S), 0.265 mg/g of Rg2(R), 0.941 mg/g of Rh1(S), 0.416 mg/g of Rh1(R), 0.274 mg/g of Rg6, 0.777 mg/g of F4, 0.862 mg/g of Rk3, 1.714 mg/g of Rh4, 4.122 mg/g of Rg3(S), 1.184 mg/g of Rg3(R), 4.747 mg/g of Rk1, and 4.539 mg/g of Rg5 existed.

When comparing the ginsenosides content contained in the black ginseng concentrate and the red ginseng concentrate, Rk1 and Rg5 increased about 40 times and about 10 times, respectively, compared to those in the red ginseng concentrate.

Experimental Example 4. Analysis of Acidic Polysaccharide Components in Black Ginseng Concentrate The analysis of acidic polysaccharide components present in the red ginseng concentrate or the black ginseng concentrate obtained in Preparation Example 3 was performed through the carbazole-sulfuric acid colorimetric method. A sample obtained by diluting 300 mg of each concentrate obtained in Preparation Example 3 above in 10 ml of distilled water was used. The diluted solution was heated in boiling water at 90° C. for 3 hours, cooled, and centrifuged (3000 rpm, 10 minutes). 1 ml of the supernatant was taken, and 4 ml of ethanol was added to form a white precipitate. To obtain the white precipitate, the supernatant was removed after centrifugation (3000 rpm, 10 minutes), 4 ml of distilled water was added to dissolve the white precipitate, and 1 ml of 1:4 mixture of n-butanol and $CHCl_3$ was added, stirred, and then centrifuged again (3000 rpm, 10 minutes). 4 ml of water extract, which is a supernatant herein, was taken, and sonication was performed.

20 μl of the sonication-completed solution, 80 μl of distilled water, 50 μl of 0.1% carbazole ethanol reagent (prepared with 0.125 g of carbazole/100 ml of anhydrous ethanol), and 600 μl of sulfuric acid, were added to a 2 ml tube and stirred. Then, 200 μl each was placed in a 96-well plate. The absorbance was measured at 530 nm, and the content was calculated using a calibration curve.

For standard products, galacturonic acid was dissolved in distilled water to prepare concentrations of 1000, 500, 250, 125 mg/L. 20 μl of the standard solution, 80 μl of distilled water, 50 μl of 0.1% carbazole ethanol reagent (prepared with 0.125 g of carbazole/100 ml of anhydrous ethanol), and 600 μl of sulfuric acid were added to a 2 ml tube and stirred. Then, 200 μl each was placed in a 96-well plate. The absorbance was measured at 530 nm to make a calibration curve, and the concentration was measured. The acidic polysaccharides content is shown below (unit: mg/g).

TABLE 2

| | Acidic polysaccharides |
|---|---|
| Red ginseng | 0.37 |
| Black ginseng | 2.63 |

As shown in Table 2, the black ginseng concentrate contained a large amount of acidic polysaccharides compared to the red ginseng concentrate.

Experimental Example 5. Analysis of Polyphenol Components in Black Ginseng Concentrate The polyphenols content present in the red ginseng concentrate and the black ginseng concentrate obtained in Preparation Example 3 was measured using a Microplate Reader (Powerwave XS, BioTek, USA). 2 g of sodium carbonate (Sigma 223484, CAS No. 497-19-8) is taken in a 100 mL constant volume flask. Distilled water was added to adjust the total volume to 100 mL to prepare a 2% sodium carbonate reagent. Folin-Ciocalteu's phenol reagent (Sigma F9252-1L) and distilled water were mixed at a ratio of 1:1 to prepare 50% Folin-Ciocalteu's phenol reagent, which was wrapped with aluminum foil to prevent light from being transmitted.

As for the test solutions, the red ginseng concentrate and the black ginseng concentrate obtained in Preparation Example 3 each were diluted with distilled water at a ratio of 1:1. 0.1 mL of each solution was taken and mixed with 0.1 mL of 50% Folin-Ciocalteu's phenol reagent and 2 mL of 2% sodium carbonate. Then, the mixture was allowed to stand in a dark place for 30 minutes, and the absorbance was measured at 750 nm. The standard solution was prepared by taking 0.4 g of gallic acid (Sigma G7384, CAS No. 149-91-7) in a 100 mL constant volume flask, adding distilled water to adjust the total volume to 100 mL, and diluting the solution to concentrations of 31.25 ppm, 62.5 ppm, 125 ppm, 250 ppm, and 500 ppm. The standard solution was mixed with the reagents in the same manner as the test solutions. Then, the mixture was allowed to stand in a dark place for 30 minutes, and the absorbance was measured at 750 nm.

After absorbance measurement, a calibration curve was prepared with the absorbance of the standard solution as the abscissa axis and the concentration of the standard solution as the ordinate axis. The total polyphenol content of the red ginseng concentrate and the black ginseng concentrate obtained in Preparation Example 3 was calculated using Equation 1 below.

$$\text{Total polyphenol content (mg/mL)} = (A \times B \times C)/D \quad \text{[Equation 1]}$$

A: Total amount of test solution (mL), B: Dilution factor, C: Total polyphenol concentration in the test solution (mg/mL), D: Collected sample amount (mL)

The polyphenols content is shown below (unit: mg/g).

TABLE 3

| | Polyphenols |
|---|---|
| Red ginseng | 10.4 |
| Black ginseng | 20.8 |

As shown in Table 3, the black ginseng concentrate contained a large amount of polyphenols compared to the red ginseng concentrate.

Summary of Experimental Examples 3 to 5

The black ginseng concentrate prepared in Preparation Example 3 had ginsenosides Rk1 and Rg5, acidic polysaccharides, and polyphenols content higher than that of the red ginseng concentrate prepared in Preparation Example 3. Accordingly, the black ginseng concentrate of Preparation Example 3 was named as a standardized black ginseng concentrate. The above standardized black ginseng concentrate was used for measuring antiviral activity.

Experimental Example 6. Measurement of Antiviral Activity of Black Ginseng Concentrate To measure the effect of inhibiting a new influenza virus of the standardized black ginseng concentrate prepared in Preparation Example above, an experiment was performed as follows. For each experimental group, six 6-week-old BALB/c mice (female) purchased from Samtaco Co., Ltd. were used as a group in the experiment.

The red ginseng concentrate or the standardized black ginseng concentrate were administered to mice every day at a concentration of 10 mg/Kg/day for 14 days. In addition to mice administered with the above red ginseng concentrate or the standardized black ginseng concentrate, to mice to be used as negative or positive controls, 30 µl of the new influenza virus (A/California/04/2009(H1N1)) was nasally inoculated, respectively. The red ginseng concentrate or the standardized black ginseng concentrate were administered to mice administered with the red ginseng concentrate or the standardized black ginseng concentrate for a further week after the influenza virus inoculation. The group not inoculated with the influenza virus was regarded as the normal group. Among the mice infected with the influenza virus, the sample-untreated group was set as a negative control group, and the group treated with the H1N1 influenza virus drug Tamiflu among the mice infected with the influenza virus was set as a positive control group. All groups were observed for the survival/fatality of mice for 14 days after the infection. To identify the mechanism of antiviral immunity effect of black ginseng, whether lung tissue was damaged five days after the infection was checked, and immune indicators (GM-CSF: granulocyte-macrophage colony-stimulating factor, IFN-γ: interferon-gamma, and IL-10: interleukin-10) were measured 1, 3, 5, and 7 days after the infection.

6-1. Assessment of Fatality after Virus Infection

The fatality rate after the virus infection is shown in FIG. 3 and Table 4.

TABLE 4

| Samples | Dosage (mg/kg/day) | Fatality (%) |
|---|---|---|
| Negative control | — | 100 |
| Positive control (Tamiflu) | 2 | 0 |
| Red Ginseng Concentrate | 10 | 50 |
| Black Ginseng Concentrate | 10 | 0 |

As shown in FIG. 3 and Table 4, the negative control group showed 100% fatality after the virus infection. Meanwhile, the fatality rate of the positive control group treated with the antiviral drug Tamiflu was 0%. In the red ginseng concentrate-administered group, a total of 3 mice out of 6 mice used in the experiment died from the virus infection, resulting in a 50% fatality rate. However, a total of six mice in the standardized black ginseng concentrate-administered group all survived. Thus, the fatality rate was 0%, the same as that of the positive control group. Therefore, the protective effect of the standardized black ginseng concentrate against the H1N1 influenza virus was significantly superior to that of the red ginseng concentrate.

6-2. Assessment of Lung Tissue Damage Degree after Virus Infection

The cause of death of mice infected with the H1N1 influenza virus means loss of respiratory function caused by tissue damage due to the accumulation of immune cells in the lung tissue 5 days after the infection, as in the lung tissue of the negative control group or the red ginseng concentrate-administered group shown in FIG. 4. The standardized black ginseng concentrate-administered group showed relatively low lung tissue damage degree compared to the red ginseng concentrate-administered group. The standardized black ginseng concentrate was shown to be superior to the red ginseng concentrate in inhibiting or ameliorating lung tissue damage caused by the H1N1 virus infection.

6-3. Assessment of Immune Activator Production Degree after Virus Infection

The effective treatment step for the H1N1 influenza virus is that immune cells proliferate at the initial stage of infection and produce a large number of immune activation factors to effectively remove the virus, and at the late stage of infection, immune cells produce immune inhibition factors to restore the host to a normal state.

As a result of this experiment, there was no change in the production of immune activation factors in the normal group, as indicated by the dotted line in the graph. Meanwhile, in the standardized black ginseng concentrate-administered group, the immune cell proliferation factor (GM-CSF) was highly expressed on day 1 of infection, the immune activation factor (IFN-γ) was highly expressed on day 3 of infection, and the immune inhibition factor (IL-10) was highly expressed on day 7 of infection. Therefore, the standardized black ginseng concentrate was found to exert an antiviral effect by increasing the proliferation and activity of immune cells at the initial stage of infection to kill the virus and then normalizing the raised immune system at the late stage of infection (see FIGS. 5a to 5c). In addition, most of these immune activation factors showed higher activity compared to the red ginseng concentrate-administered group, indicating that the standardized black ginseng concentrate had higher therapeutic and preventive effects on the H1N1 virus infection than the red ginseng concentrate.

This is considered to be because the standardized black ginseng concentrate has a higher content of ginsenosides Rk1, Rg5, acidic polysaccharides, and polyphenols than the red ginseng concentrate.

Experimental Example 7. Measurement of the
Effectiveness of Black Ginseng Concentrate on
Respiratory Health To measure the effectiveness of the standardized black ginseng concentrate prepared in Preparation Example above on respiratory health, an experiment was performed as follows. For each experimental group, six 6- to 8-week-old C57BL/6 mice (male) were used as a group in the experiment.

The red ginseng concentrate or the standardized black ginseng concentrate were administered to mice every day at a concentration of 10 or 250 mg/Kg/day for 14 days. 50 µl of ultrafine dust (SRM2975 10 mg/ml) was administered intratracheally for three days every day to mice to be used as the negative control group as well as mice administered with the red ginseng concentrate or the standardized black ginseng concentrate. The red ginseng concentrate or the standardized black ginseng concentrate were administered to mice administered with the red ginseng concentrate or the standardized black ginseng concentrate for a further week from the day of ultrafine dust administration. The group to which ultrafine dust was not administered was regarded as the normal group. All groups were euthanized 4 to 6 days after the initial injection of ultrafine dust. Then, the weight of the lungs and the number of immune (inflammatory) cells were measured to determine the anti-inflammatory effect of the black ginseng. A histopathological examination of the lungs was performed to determine the effect of reducing ultrafine dust accumulation in the respiratory lung of the black ginseng. In addition, to investigate the mechanism of respiratory health function against ultrafine dust of the black ginseng, immune indicator factors (GM-CSF: granulocyte-macrophage colony-stimulating factor, TNF: tumor necrosis factor, IL-1beta: interleukin-1beta, IL-6, IL-2, & IL-10) were measured.

Experimental Example 8. Measurement of
Anti-Aging Function of Black Ginseng Concentrate An experiment was performed to measure the effectiveness of the standardized black ginseng concentrate prepared in Preparation Example above on anti-aging function, as follows. For each experimental group, three 18-month-old C57BL/6 mice (male) were used as a group in the experiment.

The red ginseng concentrate or the standardized black ginseng concentrate were administered to mice every day at a concentration of 300 mg/Kg for 14 days. All groups were injected every day for 28 days and then euthanized. To confirm the anti-aging effect of black ginseng, the expression of genes and proteins, such as aging-related indicators p15INK4b, p16INK4a, p21, p27, p38, p53, CDK1, CDK2, mechanistic target of rapamycin (mTOR), sirtuin 1 (SIRT1), and β-galactosidase (β-gal) staining were measured from liver tissues and hepatocytes isolated from liver tissues.

Preparation Example 4. Preparation of Foods 4-1. Preparation of Wheat Flour Foods
0.5 to 5.0 parts by weight of the black ginseng extract of the present invention was added to wheat flour, and this mixture was used to prepare bread, cakes, cookies, crackers, and noodles.
4-2. Preparation of Soups and Gravies
0.2 to 5.0 parts by weight of the black ginseng extract of the present invention was added to soups and gravies to prepare meat-processed products for health improvement, noodle-style soups, and gravies.
4-3. Preparation of Ground Beef
10 parts by weight of the black ginseng extract of the present invention was added to ground beef to prepare ground beef for health improvement.
4-4. Preparation of Dairy Products
5 to 10 parts by weight of the black ginseng extract of the present invention was added to milk, and various dairy products such as butter and ice cream were prepared using the milk.
4-5. Preparation of Dry Cereal
Brown rice, barley, glutinous rice, and adlay were pregelatinized by a conventional method, dried, roasted, and prepared into powders by a pulverizer to have a particle size of 60 mesh.

Black beans, black sesame, and perilla seeds were also steamed and dried by a conventional method, roasted, and prepared into powders by a pulverizer to have a particle size of 60 mesh.

The black ginseng extract of the present invention was concentrated under reduced pressure, sprayed, and dried by a hot air dryer. The resulting dry product was prepared into powders by a pulverizer to have a particle size of 60 mesh.

The thus-prepared grains, seeds and nuts, and the black ginseng extract of the present invention were mixed in the following ratio to prepare dry cereal:
grains (brown rice (30 parts by weight), adlay (15 parts by weight), and barley (20 parts by weight)), seeds and nuts (perilla seeds (7 parts by weight), black beans (8 parts by weight), black sesame (7 parts by weight), the black ginseng extract of the present invention (3 parts by weight), *Ganoderma lucidum* (0.5 part by weight), and *Rehmannia glutinosa* (0.5 part by weight).
4-6. Preparation of Health Drinks
5 g of the black ginseng extract of the present invention was homogeneously mixed with minor ingredients, such as high fructose corn syrup (0.5%), oligosaccharide (2%), sugar (2%), salt (0.5%), and water (75%). The mixture was sterilized instantly and packaged in small containers, such as glass bottles, pet bottles, etc., to prepare health drinks.
4-7. Preparation of Vegetable Juice
5 g of the black ginseng extract of the present invention was added to 1,000 ml of tomato or carrot juice to prepare vegetable juice.
4-8. Preparation of Fruit Juice
1 g of the black ginseng extract of the present invention was added to 1,000 ml of apple or grape juice to prepare fruit juice.

Preparation Example 5. Preparation of
Pharmaceutical Compositions 5-1. Preparation of Powders
The black ginseng extract of the present invention 2 g
Lactose 1 g
The above ingredients were mixed and filled in an airtight pouch to prepare powders.
5-2. Preparation of Tablets
The black ginseng extract of the present invention 100 mg
Corn starch 100 mg
Lactose 100 mg
Magnesium stearate 2 mg
The above noted ingredients were mixed and tableted according to a conventional tablet preparation method to provide tablets.

5-3. Preparation of Capsules

The black ginseng extract of the present invention 100 mg
Corn starch 100 mg
Lactose 100 mg
Magnesium stearate 2 mg The above ingredients were mixed and filled in a gelatin capsule according to a conventional method for preparing capsules to prepare capsules.

5-4. Preparation of Pills

The black ginseng extract of the present invention 1 g
Lactose 1.5 g
Glyserine 1 g
Xylitol 0.5 g The above ingredients were mixed and prepared into a pill according to a conventional method in such a manner that one pill has a weight of 4 g.

5-5. Preparation of Granules

The black ginseng extract of the present invention 150 mg
Soybean extract 50 mg
Glucose 200 mg
Starch 600 mg The above ingredients were mixed and 100 mg of 30% ethanol was added thereto, followed by drying at 60° C. After formation of granules, the granules were filled into packaging.

The invention claimed is:

1. A method for preparing a black ginseng extract enriched with ginsenosides Rk1 and Rg5, the method comprising:
a step for steaming ginseng to prepare black ginseng;
a step for extracting the prepared black ginseng with a solvent; and
a step for maturing the obtained black ginseng extract,
wherein the step for maturing the obtained black ginseng extract is performed at 80° C. or higher and for 3 hours or more.

2. The method for preparing a black ginseng extract of claim 1, wherein the steaming is performed at 70° C. to 120° C. and is repeated for 3 to 12 cycles.

3. The method for preparing a black ginseng extract of claim 1, wherein the steaming is performed under the condition of 2 hours or more per one cycle of steaming.

4. The method for preparing a black ginseng extract of claim 1, wherein the step for maturing the black ginseng extract is performed at 82° C. to 95° C.

5. The method for preparing a black ginseng extract of claim 1, wherein the step for maturing the black ginseng extract is performed for 3 hours to 48 hours.

6. The method for preparing a black ginseng extract of claim 1, wherein a total content of ginsenosides Rk1 and Rg5 in the black ginseng extract is 20 parts by weight to 90 parts by weight, based on 100 parts by weight of the total content of the ginsenosides Rb1, Rb2, Rc, Rd, Re, Rg1, Rg3(s), Rk1, Rg5, and Rh1(s) in the black ginseng extract.

7. The method for preparing a black ginseng extract of claim 1, wherein the black ginseng extract further comprises acidic polysaccharides and polyphenols.

8. The method for preparing a black ginseng extract of claim 1, wherein the steaming is performed at 90° C. to 100° C.

9. The method for preparing a black ginseng extract of claim 1, wherein the steaming is is repeated for 7 to 9 cycles.

10. The method for preparing a black ginseng extract of claim 1, wherein the steaming is performed for 2 to 3 hours per steaming.

11. The method for preparing a black ginseng extract of claim 5, wherein the step for maturing the black ginseng extract is performed at 82° C. to 95° C.

12. The method for preparing a black ginseng extract of claim 1, wherein the step for maturing the black ginseng extract is performed for 3 hours to 28 hours.

13. The method for preparing a black ginseng extract of claim 1, wherein the step for maturing the obtained black ginseng extract is performed at 88° C. to 90° C.

14. The method for preparing a black ginseng extract of claim 1, wherein the step for extracting the prepared black ginseng with a solvent is performed for 3 to 28 hours.

15. The method for preparing a black ginseng extract of claim 1, wherein the step for extracting the prepared black ginseng with a solvent is performed at 82° C. to 95° C.

* * * * *